United States Patent
Moore et al.

(10) Patent No.: US 11,560,520 B2
(45) Date of Patent: *Jan. 24, 2023

(54) MULTI-STAGE PROCESS AND DEVICE FOR TREATMENT HEAVY MARINE FUEL OIL AND RESULTANT COMPOSITION AND THE REMOVAL OF DETRIMENTAL SOLIDS

(71) Applicant: Magēmā Technology, LLC, Houston, TX (US)

(72) Inventors: Michael Joseph Moore, Houston, TX (US); Bertrand Ray Klussmann, Houston, TX (US); Carter James White, Houston, TX (US)

(73) Assignee: Magēmā Technology LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/103,891

(22) Filed: Aug. 14, 2018

(65) Prior Publication Data

US 2019/0010405 A1   Jan. 10, 2019

Related U.S. Application Data

(63) Continuation-in-part of application No. PCT/US2018/017855, filed on Feb. 12, 2018, which
(Continued)

(51) Int. Cl.
*C10G 45/02* (2006.01)
*C10G 45/04* (2006.01)
(Continued)

(52) U.S. Cl.
CPC ............ *C10G 45/04* (2013.01); *B01D 3/343* (2013.01); *B01D 53/1481* (2013.01);
(Continued)

(58) Field of Classification Search
CPC .. C10G 45/34; C10G 45/02; C10G 2300/202; C10G 2300/205; C10G 2300/208; C10L 2200/0438
See application file for complete search history.

(56) References Cited

U.S. PATENT DOCUMENTS 3,163,593 A   12/1964   Webster et al.
3,227,645 A   1/1966    Frumkin et al.
(Continued)

FOREIGN PATENT DOCUMENTS

CA   1054130   5/1979
CA   1060370   8/1979
(Continued)

OTHER PUBLICATIONS

James G. Speight, The Desulfurization of Heavy Oils and Residua, 2nd Ed. 1999, Chapter 5, pp. 168-205, Marcel Dekker Inc. New York NY US.
(Continued)

*Primary Examiner* — Ellen M McAvoy
*Assistant Examiner* — Ming Cheung Po
(74) *Attorney, Agent, or Firm* — Carter J White

(57) ABSTRACT

A multi-stage process for reducing the environmental contaminants in an ISO8217 compliant Feedstock Heavy Marine Fuel Oil involving a core desulfurizing process and a Detrimental Solids removal unit as either a pre-treating step or post-treating step to the core process. The Product Heavy Marine Fuel Oil complies with ISO 8217 for residual marine fuel oils and has a sulfur level has a maximum sulfur content (ISO 14596 or ISO 8754) between the range of 0.05 mass % to 1.0 mass and a Detrimental Solids content less than 60 mg/kg. A process plant for conducting the process is also disclosed.

18 Claims, 5 Drawing Sheets

Related U.S. Application Data is a continuation-in-part of application No. PCT/US2018/017863, filed on Feb. 12, 2018.

(60) Provisional application No. 62/589,479, filed on Nov. 21, 2017, provisional application No. 62/458,002, filed on Feb. 12, 2017.

(51) Int. Cl.

| | | |
|---|---|---|
| *C10G 67/06* | (2006.01) | |
| *C10G 45/22* | (2006.01) | |
| *C10G 45/08* | (2006.01) | |
| *C10G 25/02* | (2006.01) | |
| *C10G 25/00* | (2006.01) | |
| *B01D 3/34* | (2006.01) | |
| *B01J 8/04* | (2006.01) | |
| *C10G 65/04* | (2006.01) | |
| *C10L 1/12* | (2006.01) | |
| *C10L 1/14* | (2006.01) | |
| *C10L 1/16* | (2006.01) | |
| *B01D 53/14* | (2006.01) | |
| *C10G 7/00* | (2006.01) | |
| *C10G 45/06* | (2006.01) | |
| *C10L 1/04* | (2006.01) | |
| *C10G 67/02* | (2006.01) | |
| *B01J 8/00* | (2006.01) | |
| *B01J 21/04* | (2006.01) | |
| *B01J 23/24* | (2006.01) | |
| *B01J 23/40* | (2006.01) | |
| *B01J 23/74* | (2006.01) | |
| *C10G 65/16* | (2006.01) | |
| *B01J 8/02* | (2006.01) | |
| *C10G 47/02* | (2006.01) | |
| *C10G 69/02* | (2006.01) | |

(52) U.S. Cl.
CPC ............ *B01J 8/008* (2013.01); *B01J 8/0278* (2013.01); *B01J 8/0292* (2013.01); *B01J 8/0457* (2013.01); *B01J 8/0492* (2013.01); *B01J 21/04* (2013.01); *B01J 23/24* (2013.01); *B01J 23/40* (2013.01); *B01J 23/74* (2013.01); *C10G 7/00* (2013.01); *C10G 25/003* (2013.01); *C10G 25/02* (2013.01); *C10G 45/02* (2013.01); *C10G 45/06* (2013.01); *C10G 45/08* (2013.01); *C10G 45/22* (2013.01); *C10G 47/02* (2013.01); *C10G 65/04* (2013.01); *C10G 65/16* (2013.01); *C10G 67/02* (2013.01); *C10G 67/06* (2013.01); *C10G 69/02* (2013.01); *C10L 1/04* (2013.01); *C10L 1/12* (2013.01); *C10L 1/14* (2013.01); *C10L 1/1608* (2013.01); *B01J 2208/00557* (2013.01); *B01J 2208/02* (2013.01); *B01J 2208/025* (2013.01); *C10G 2300/107* (2013.01); *C10G 2300/1037* (2013.01); *C10G 2300/1044* (2013.01); *C10G 2300/1048* (2013.01); *C10G 2300/1059* (2013.01); *C10G 2300/1077* (2013.01); *C10G 2300/201* (2013.01); *C10G 2300/202* (2013.01); *C10G 2300/205* (2013.01); *C10G 2300/206* (2013.01); *C10G 2300/207* (2013.01); *C10G 2300/208* (2013.01); *C10G 2300/30* (2013.01); *C10G 2300/302* (2013.01); *C10G 2300/308* (2013.01); *C10G 2300/4012* (2013.01); *C10G 2300/4018* (2013.01); *C10G 2300/4062* (2013.01); *C10G 2300/70* (2013.01); *C10G 2300/80* (2013.01); *C10G 2400/04* (2013.01); *C10G 2400/06* (2013.01); *C10L 2200/0263* (2013.01); *C10L 2200/0438* (2013.01); *C10L 2270/02* (2013.01); *C10L 2270/026* (2013.01)

(56) References Cited

U.S. PATENT DOCUMENTS

| | | | |
|---|---|---|---|
| 3,234,121 | A | 2/1966 | Maclaren |
| 3,287,254 | A | 11/1966 | Paterson |
| 3,306,845 | A | 2/1967 | Poll |
| 3,531,398 | A | 9/1970 | Adams |
| 3,544,452 | A | 12/1970 | Jaffe |
| 3,562,800 | A | 2/1971 | Carlson et al. |
| 3,577,353 | A | 5/1971 | White |
| 3,658,681 | A | 4/1972 | Wilson et al. |
| 3,668,116 | A | 6/1972 | Adams et al. |
| 3,684,688 | A | 8/1972 | Roselius |
| 3,749,664 | A | 7/1973 | Mickleson |
| 3,814,683 | A | 6/1974 | Christman et al. |
| 3,859,199 | A | 1/1975 | Gatsis |
| 3,880,598 | A | 4/1975 | Van Der Toorn |
| 3,893,909 | A | 7/1975 | Selvidge |
| 3,902,991 | A | 9/1975 | Christensen et al. |
| 3,926,784 | A * | 12/1975 | Christman ............ C10G 45/02 208/59 |
| 4,006,076 | A | 2/1977 | Christensen et al. |
| 4,017,382 | A | 4/1977 | Bonnell et al. |
| 4,054,508 | A * | 10/1977 | Milstein ................ B01J 35/10 208/89 |
| 4,089,774 | A * | 5/1978 | Oleck ...................... B01J 35/10 208/89 |
| 4,138,227 | A | 2/1979 | Wilson et al. |
| 4,267,033 | A | 5/1981 | Heck et al. |
| 4,306,964 | A | 12/1981 | Angevine |
| 4,357,263 | A | 11/1982 | Heck et al. |
| 4,404,097 | A | 9/1983 | Angevine et al. |
| 4,420,388 | A | 12/1983 | Bertolacini et al. |
| 4,460,707 | A | 7/1984 | Simpson |
| 4,548,710 | A | 10/1985 | Simpson |
| 4,604,185 | A | 8/1986 | McConaghy, Jr. et al. |
| 4,645,584 | A | 2/1987 | Didchenko et al. |
| 4,925,554 | A | 5/1990 | Sato et al. |
| 5,167,796 | A | 12/1992 | Didchenko et al. |
| 5,306,419 | A | 4/1994 | Harrison et al. |
| 5,342,507 | A | 8/1994 | Dai et al. |
| 5,374,350 | A | 12/1994 | Heck et al. |
| 5,389,595 | A | 2/1995 | Simpson et al. |
| 5,391,304 | A | 2/1995 | Lantos |
| 5,401,392 | A | 3/1995 | Courty et al. |
| 5,417,846 | A | 5/1995 | Renard |
| 5,543,036 | A | 8/1996 | Chang et al. |
| 5,591,325 | A | 1/1997 | Higashi |
| 5,622,616 | A | 4/1997 | Porter et al. |
| 5,686,375 | A | 11/1997 | Iyer et al. |
| 5,759,385 | A | 6/1998 | Aussillous et al. |
| 5,779,992 | A | 7/1998 | Higashi |
| 5,837,130 | A | 11/1998 | Crossland |
| 5,868,923 | A | 2/1999 | Porter et al. |
| 5,882,364 | A | 3/1999 | Dilworth |
| 5,888,379 | A | 3/1999 | Ushio et al. |
| 5,897,768 | A | 4/1999 | McVicker et al. |
| 5,917,101 | A | 6/1999 | Munoz |
| 5,922,189 | A | 7/1999 | Santos |
| 5,928,501 | A | 7/1999 | Sudhakar et al. |
| 5,948,239 | A | 9/1999 | Virdi et al. |
| 5,958,816 | A | 9/1999 | Neuman et al. |
| 5,961,709 | A | 10/1999 | Hayner et al. |
| 5,976,361 | A | 11/1999 | Hood et al. |
| 5,997,723 | A | 12/1999 | Wiehe et al. |
| 6,017,443 | A | 1/2000 | Buchanan |
| 6,117,306 | A | 9/2000 | Morel et al. |
| 6,160,193 | A | 12/2000 | Gore |
| 6,162,350 | A | 12/2000 | Soled et al. |
| 6,171,477 | B1 | 1/2001 | Morel et al. |
| 6,193,766 | B1 | 2/2001 | Jordan |
| 6,203,695 | B1 | 3/2001 | Harle et al. |

(56) References Cited

U.S. PATENT DOCUMENTS

| | | |
|---|---|---|
| 6,207,041 B1 | 3/2001 | Morel et al. |
| 6,217,749 B1 | 4/2001 | Espeillac et al. |
| 6,251,262 B1 | 6/2001 | Hatanaka et al. |
| 6,251,263 B1 | 6/2001 | Hatanaka et al. |
| 6,265,629 B1 | 7/2001 | Fava et al. |
| 6,299,759 B1 | 10/2001 | Bradway et al. |
| 6,303,531 B1 | 10/2001 | Lussier et al. |
| 6,306,287 B1 | 10/2001 | Billon et al. |
| 6,306,289 B1 | 10/2001 | Hayashi et al. |
| 6,328,880 B1 | 12/2001 | Yoshita et al. |
| 6,344,136 B1 | 2/2002 | Butler et al. |
| 6,383,975 B1 | 5/2002 | Rocha et al. |
| 6,402,940 B1 | 6/2002 | Rappas |
| 6,406,615 B1 | 6/2002 | Iwamoto et al. |
| 6,540,904 B1 | 4/2003 | Gun et al. |
| 6,554,994 B1 | 4/2003 | Reynolds et al. |
| 6,566,296 B2 | 5/2003 | Plantenga et al. |
| 6,576,584 B1 | 6/2003 | Iijima et al. |
| 6,589,908 B1 | 7/2003 | Ginestra et al. |
| 6,620,313 B1 | 9/2003 | Soled et al. |
| 6,649,042 B2 | 11/2003 | Dassori et al. |
| 6,656,348 B2 | 12/2003 | Dassori et al. |
| 6,656,349 B1 | 12/2003 | Fujita et al. |
| 6,673,230 B2 | 1/2004 | Hagen |
| 6,712,955 B1 | 3/2004 | Soled et al. |
| 6,733,659 B1 | 5/2004 | Kure et al. |
| 6,783,661 B1 | 8/2004 | Briot et al. |
| 6,797,153 B1 | 9/2004 | Fukuyama et al. |
| 6,858,132 B2 | 2/2005 | Kumagai et al. |
| 6,860,987 B2 | 3/2005 | Plantenga et al. |
| 6,863,803 B1 | 3/2005 | Riley et al. |
| 6,929,738 B1 | 8/2005 | Riley et al. |
| 6,984,310 B2 | 1/2006 | Ginstra et al. |
| 7,001,503 B1 | 2/2006 | Koyama et al. |
| 7,108,779 B1 | 9/2006 | Thakkar |
| 7,119,045 B2 | 10/2006 | Magna et al. |
| 7,166,209 B2 | 1/2007 | Dassori |
| 7,169,294 B2 | 1/2007 | Abe et al. |
| 7,232,515 B1 | 6/2007 | Demmin et al. |
| 7,244,350 B2 | 7/2007 | Martin et al. |
| 7,265,075 B2 | 9/2007 | Tsukada et al. |
| 7,288,182 B1 | 10/2007 | Soled et al. |
| 7,384,537 B2 | 6/2008 | Nagamatsu et al. |
| 7,402,547 B2 | 7/2008 | Wellington et al. |
| 7,413,646 B2 | 8/2008 | Wellington et al. |
| 7,416,653 B2 | 8/2008 | Wellington |
| 7,449,102 B2 | 11/2008 | Kalnes |
| 7,491,313 B2 | 2/2009 | Toshima et al. |
| 7,507,325 B2 | 3/2009 | Gueret et al. |
| 7,513,989 B1 | 4/2009 | Soled et al. |
| 7,517,446 B2 | 4/2009 | Lott |
| 7,534,342 B2 | 5/2009 | Bhan et al. |
| 7,585,406 B2 | 9/2009 | Khadzhiev et al. |
| 7,588,681 B2 | 9/2009 | Bhan et al. |
| 7,651,604 B2 | 1/2010 | Ancheyta Juarez et al. |
| 7,651,605 B2 | 1/2010 | Sahara et al. |
| 7,695,610 B2 | 4/2010 | Bolshakov et al. |
| 7,713,905 B2 | 5/2010 | Dufresne et al. |
| 7,718,050 B2 | 5/2010 | Gueret et al. |
| 7,754,162 B2 | 7/2010 | Dassori |
| 7,901,569 B2 | 3/2011 | Farshid et al. |
| 7,938,955 B2 | 5/2011 | Araki et al. |
| 7,943,035 B2 | 5/2011 | Chornet et al. |
| 8,012,343 B2 | 9/2011 | Plantenga et al. |
| 8,021,538 B2 | 9/2011 | Klein |
| 8,114,806 B2 | 2/2012 | Bhan et al. |
| 8,163,166 B2 | 4/2012 | Wellington et al. |
| 8,173,570 B2 | 5/2012 | Maesen et al. |
| 8,241,489 B2 | 8/2012 | Bhan et al. |
| 8,268,164 B2 | 9/2012 | Wellington et al. |
| 8,318,000 B2 | 11/2012 | Bhan et al. |
| 8,318,628 B2 | 11/2012 | Brun et al. |
| 8,343,887 B2 | 1/2013 | Maesen et al. |
| 8,371,741 B2 | 2/2013 | Hassan |
| 8,372,268 B2 | 2/2013 | Ginestra et al. |
| 8,394,254 B2 | 3/2013 | Wellington et al. |
| 8,394,262 B2 | 3/2013 | Guichard et al. |
| 8,475,651 B2 | 7/2013 | Bhan et al. |
| 8,506,794 B2 | 8/2013 | Bhan et al. |
| 8,546,626 B2 | 10/2013 | Daudin et al. |
| 8,563,456 B2 | 10/2013 | Dillon et al. |
| 8,608,938 B2 | 12/2013 | Wellington et al. |
| 8,608,946 B2 | 12/2013 | Bhan et al. |
| 8,613,851 B2 | 12/2013 | Wellington et al. |
| 8,652,817 B2 | 2/2014 | Wood et al. |
| 8,663,453 B2 | 3/2014 | Wellington et al. |
| 8,679,319 B2 | 3/2014 | Milam et al. |
| 8,679,322 B2 | 3/2014 | Marzin et al. |
| 8,702,970 B2 | 4/2014 | Maesen et al. |
| 8,716,164 B2 | 5/2014 | Dillon et al. |
| 8,721,871 B1 | 5/2014 | Dindi et al. |
| 8,722,558 B2 | 5/2014 | Konno et al. |
| 8,722,563 B2 | 5/2014 | Soled et al. |
| 8,722,564 B2 | 5/2014 | Soled et al. |
| 8,741,129 B2 | 6/2014 | Brown et al. |
| 8,747,659 B2 | 6/2014 | Kiss et al. |
| 8,764,972 B2 | 7/2014 | Bhan et al. |
| 8,784,646 B2 | 7/2014 | Sanchez et al. |
| 8,795,514 B2 | 8/2014 | Kimura et al. |
| 8,821,714 B2 | 9/2014 | Chaumonnot et al. |
| 8,877,040 B2 | 11/2014 | Hoehn et al. |
| 8,894,838 B2 | 11/2014 | Dindi et al. |
| 8,926,826 B2 | 1/2015 | Dindi et al. |
| 8,946,110 B2 | 2/2015 | Toledo Antonio et al. |
| 8,962,514 B2 | 2/2015 | Seki et al. |
| 8,987,537 B1 | 3/2015 | Droubi et al. |
| 8,999,011 B2 | 4/2015 | Stern |
| 9,057,035 B1 | 6/2015 | Kraus et al. |
| 9,102,884 B2 | 8/2015 | Xu et al. |
| 9,109,176 B2 | 8/2015 | Stern et al. |
| 9,127,215 B2 | 9/2015 | Choi et al. |
| 9,127,218 B2 | 9/2015 | Banerjee et al. |
| 9,139,782 B2 | 9/2015 | Dindi et al. |
| 9,206,363 B2 | 12/2015 | Woo et al. |
| 9,212,323 B2 | 12/2015 | Dindi et al. |
| 9,216,407 B2 | 12/2015 | Duma et al. |
| 9,260,671 B2 | 2/2016 | Shafi et al. |
| 9,278,339 B2 | 3/2016 | Bellussi et al. |
| 9,340,733 B2 | 5/2016 | Marchand et al. |
| 9,359,561 B2 | 6/2016 | Bazer-Bachi et al. |
| 9,365,781 B2 | 6/2016 | Dindi |
| 9,365,782 B2 | 6/2016 | Dindi |
| 9,387,466 B2 | 7/2016 | Rana et al. |
| 9,434,893 B2 | 9/2016 | Dufresne |
| 9,458,396 B2 | 10/2016 | Weiss et al. |
| 9,487,718 B2 | 11/2016 | Kraus et al. |
| 9,499,758 B2 | 11/2016 | Droubi et al. |
| 9,512,319 B2 | 12/2016 | Chatron-Michuad et al. |
| 9,540,573 B2 | 1/2017 | Bhan |
| 9,546,327 B2 | 1/2017 | Krasu et al. |
| 9,605,215 B2 | 3/2017 | Lott et al. |
| 9,624,448 B2 | 4/2017 | Joo et al. |
| 9,650,312 B2 | 5/2017 | Baldassari et al. |
| 9,650,580 B2 | 5/2017 | Merdrignac |
| 9,657,236 B2 | 5/2017 | Yang et al. |
| 9,675,968 B2 | 6/2017 | Alonso Nunez et al. |
| 9,737,883 B2 | 8/2017 | Yamane et al. |
| 9,803,152 B2 | 10/2017 | Kar |
| 9,896,630 B2 | 2/2018 | Weiss et al. |
| 9,908,105 B2 | 3/2018 | Duma et al. |
| 9,908,107 B2 | 3/2018 | Osaki et al. |
| 9,919,293 B1 | 3/2018 | Rana et al. |
| 10,138,438 B2 | 11/2018 | Houten |
| 10,144,882 B2 | 12/2018 | Dindi et al. |
| 10,150,930 B2 | 12/2018 | Houten |
| 10,308,884 B2 | 6/2019 | Klussman et al. |
| 10,443,006 B1 | 10/2019 | Fruchey et al. |
| 10,533,141 B2 * | 1/2020 | Moore .................. B01J 8/0457 |
| 10,563,133 B2 | 2/2020 | Moore et al. |
| 10,584,287 B2 | 3/2020 | Klussman et al. |
| 10,597,594 B1 | 3/2020 | Fruchey et al. |
| 10,604,709 B2 * | 3/2020 | Moore .................. C10G 69/04 |
| 10,876,053 B2 | 6/2020 | Klussmann et al. |
| 10,899,983 B1 | 1/2021 | Kar et al. |

(56) References Cited

U.S. PATENT DOCUMENTS

| | | |
|---|---|---|
| 10,954,456 B2 | 3/2021 | Moore et al. |
| 10,995,290 B2 | 5/2021 | Anderson et al. |
| 2001/0001036 A1 | 5/2001 | Espeillac et al. |
| 2001/0013484 A1 | 8/2001 | Zeuthen et al. |
| 2002/0037806 A1 | 3/2002 | Dufresne et al. |
| 2002/0045540 A1 | 4/2002 | Bartholdy |
| 2002/0056664 A1 | 5/2002 | Chabot |
| 2002/0070147 A1 | 6/2002 | Sonnemans et al. |
| 2002/0117426 A1 | 8/2002 | Holder |
| 2002/0144932 A1 | 10/2002 | Gong et al. |
| 2002/0148757 A1 | 10/2002 | Huff et al. |
| 2002/0157990 A1 | 10/2002 | Feimer et al. |
| 2002/0195375 A1 | 12/2002 | Chapus et al. |
| 2003/0042172 A1 | 3/2003 | Sharivker et al. |
| 2003/0125198 A1 | 7/2003 | Ginestra et al. |
| 2003/0131526 A1 | 7/2003 | Kresnyak et al. |
| 2003/0146133 A1 | 8/2003 | Nagamatsu et al. |
| 2003/0217951 A1 | 11/2003 | Marchal-George et al. |
| 2004/0007501 A1 | 1/2004 | Sughrue et al. |
| 2004/0020829 A1 | 2/2004 | Magna et al. |
| 2004/0040890 A1 | 3/2004 | Morton et al. |
| 2004/0055934 A1 | 3/2004 | Tromeur et al. |
| 2004/0134837 A1 | 7/2004 | Dassori |
| 2004/0178117 A1 | 9/2004 | Morton et al. |
| 2004/0186014 A1 | 9/2004 | Tsukada et al. |
| 2004/0209771 A1 | 10/2004 | Abe et al. |
| 2004/0232041 A1 | 11/2004 | Kiser et al. |
| 2004/0256293 A1 | 12/2004 | Abe et al. |
| 2005/0020446 A1 | 1/2005 | Choudhary et al. |
| 2005/0101480 A1 | 5/2005 | Ackerman et al. |
| 2005/0109674 A1 | 5/2005 | Klein |
| 2005/0113250 A1 | 5/2005 | Schleicher et al. |
| 2005/0133405 A1 | 6/2005 | Wellington et al. |
| 2005/0133406 A1 | 6/2005 | Wellington et al. |
| 2005/0133411 A1 | 6/2005 | Zeuthen et al. |
| 2005/0133416 A1 | 6/2005 | Bhan et al. |
| 2005/0133417 A1 | 6/2005 | Bhan et al. |
| 2005/0135997 A1 | 6/2005 | Wellington et al. |
| 2005/0139512 A1 | 6/2005 | Wellington et al. |
| 2005/0139520 A1 | 6/2005 | Bhan et al. |
| 2005/0139522 A1 | 6/2005 | Bhan et al. |
| 2005/0145537 A1 | 7/2005 | Wellington et al. |
| 2005/0145538 A1 | 7/2005 | Wellington et al. |
| 2005/0145543 A1 | 7/2005 | Bhan et al. |
| 2005/0148487 A1 | 7/2005 | Brownscombe et al. |
| 2005/0150156 A1 | 7/2005 | Karas et al. |
| 2005/0150818 A1 | 7/2005 | Bhan et al. |
| 2005/0155906 A1 | 7/2005 | Wellington et al. |
| 2005/0167321 A1 | 8/2005 | Wellington et al. |
| 2005/0167327 A1 | 8/2005 | Bhan et al. |
| 2005/0167328 A1 | 8/2005 | Bhan et al. |
| 2005/0167329 A1 | 8/2005 | Bhan et al. |
| 2005/0167331 A1 | 8/2005 | Bhan et al. |
| 2005/0269245 A1 | 12/2005 | Huve |
| 2006/0052235 A1 | 3/2006 | Bai et al. |
| 2006/0060501 A1 | 3/2006 | Gauthier et al. |
| 2006/0060509 A1 | 3/2006 | Miyauchi et al. |
| 2006/0060510 A1 | 3/2006 | Bhan |
| 2006/0102522 A1 | 5/2006 | Turaga et al. |
| 2006/0115392 A1 | 6/2006 | Dassori |
| 2006/0175229 A1 | 8/2006 | Montanari et al. |
| 2006/0211900 A1 | 9/2006 | Iki et al. |
| 2006/0231456 A1 | 10/2006 | Bhan |
| 2006/0231465 A1 | 10/2006 | Bhan |
| 2006/0234876 A1 | 10/2006 | Bhan |
| 2006/0234877 A1 | 10/2006 | Bhan |
| 2006/0249429 A1 | 11/2006 | Iki et al. |
| 2006/0281638 A1 | 12/2006 | Zaid et al. |
| 2006/0289340 A1 | 12/2006 | Brownscombe et al. |
| 2007/0000808 A1 | 1/2007 | Bhan et al. |
| 2007/0000810 A1 | 1/2007 | Bhan et al. |
| 2007/0012595 A1 | 1/2007 | Brownscombe et al. |
| 2007/0072765 A1 | 3/2007 | Soled et al. |
| 2007/0084753 A1 | 4/2007 | Iki et al. |
| 2007/0105714 A1 | 5/2007 | Turaga et al. |
| 2007/0108098 A1 | 5/2007 | Flint et al. |
| 2007/0131584 A1 | 6/2007 | Kaines |
| 2007/0138055 A1 | 6/2007 | Farshid et al. |
| 2007/0170096 A1 | 7/2007 | Shan et al. |
| 2007/0175797 A1 | 8/2007 | Iki et al. |
| 2007/0284285 A1 | 12/2007 | Stepanik et al. |
| 2008/0017551 A1 | 1/2008 | Kiriyama et al. |
| 2008/0047875 A1 | 2/2008 | Karas et al. |
| 2008/0073247 A1 | 3/2008 | Bolshakov |
| 2008/0085225 A1 | 4/2008 | Bhan et al. |
| 2008/0135453 A1 | 6/2008 | Bhan |
| 2008/0149531 A1 | 6/2008 | Roy-Auberger et al. |
| 2008/0167180 A1 | 7/2008 | Van Den Brink et al. |
| 2008/0210595 A1 | 9/2008 | Bolshakov et al. |
| 2008/0223755 A1 | 9/2008 | Roy-Auberger et al. |
| 2008/0230440 A1 | 9/2008 | Graham et al. |
| 2008/0245700 A1 | 10/2008 | Wellington et al. |
| 2008/0245702 A1 | 10/2008 | Wellington et al. |
| 2008/0262115 A1 | 10/2008 | Calis et al. |
| 2008/0272027 A1 | 11/2008 | Wellington et al. |
| 2008/0272028 A1 | 11/2008 | Wellington et al. |
| 2008/0308459 A1 | 12/2008 | Iki et al. |
| 2009/0048097 A1 | 2/2009 | Jones et al. |
| 2009/0057194 A1 | 3/2009 | Farshid et al. |
| 2009/0057197 A1 | 3/2009 | Bhan et al. |
| 2009/0062590 A1 | 3/2009 | Nadler et al. |
| 2009/0114569 A1 | 5/2009 | Dsaheni et al. |
| 2009/0134064 A1 | 5/2009 | Reynolds |
| 2009/0139902 A1 | 6/2009 | Kressmann et al. |
| 2009/0166260 A1 | 7/2009 | Roy-Auberger et al. |
| 2009/0178951 A1 | 7/2009 | Balthasar et al. |
| 2009/0230022 A1 | 9/2009 | Gorbaty et al. |
| 2009/0234166 A1 | 9/2009 | Gorbaty et al. |
| 2009/0255850 A1 | 10/2009 | Bhan et al. |
| 2009/0255851 A1 | 10/2009 | Bhan et al. |
| 2009/0275788 A1 | 11/2009 | Bedard et al. |
| 2009/0283444 A1 | 11/2009 | Bhan et al. |
| 2009/0288987 A1 | 11/2009 | Bhan et al. |
| 2009/0308791 A1 | 12/2009 | Bhan et al. |
| 2009/0308812 A1 | 12/2009 | Osaheni et al. |
| 2009/0314686 A1 | 12/2009 | Zimmerman |
| 2010/0006475 A1 | 1/2010 | Ginestra |
| 2010/0018902 A1 | 1/2010 | Brownscombe et al. |
| 2010/0025291 A1 | 2/2010 | Shafi et al. |
| 2010/0044274 A1 | 2/2010 | Brun et al. |
| 2010/0055005 A1 | 3/2010 | Bhan et al. |
| 2010/0098602 A1 | 4/2010 | Bhan et al. |
| 2010/0155301 A1 | 6/2010 | Guichard et al. |
| 2010/0200463 A1 | 8/2010 | Patron et al. |
| 2010/0213103 A1 | 8/2010 | Patron et al. |
| 2010/0243526 A1 | 9/2010 | Ginestra et al. |
| 2010/0243532 A1 | 9/2010 | Myers et al. |
| 2010/0264067 A1 | 10/2010 | Osaheni et al. |
| 2010/0294698 A1 | 11/2010 | e Mello et al. |
| 2010/0326890 A1 | 12/2010 | Bhan |
| 2011/0017637 A1 | 1/2011 | Reynolds et al. |
| 2011/0079542 A1 | 4/2011 | Ellis et al. |
| 2011/0083997 A1 | 4/2011 | Silva et al. |
| 2011/0094938 A1 | 4/2011 | Morel |
| 2011/0108461 A1 | 5/2011 | Gabrielov et al. |
| 2011/0127194 A1 | 6/2011 | Zhang et al. |
| 2011/0155558 A1 | 6/2011 | Cardoso et al. |
| 2011/0155644 A1 | 6/2011 | Bhattacharyya et al. |
| 2011/0174681 A1 | 7/2011 | Milam et al. |
| 2011/0178346 A1 | 7/2011 | Milam et al. |
| 2011/0186477 A1 | 8/2011 | Milam et al. |
| 2011/0186480 A1 | 8/2011 | Milam et al. |
| 2011/0203971 A1 | 8/2011 | Kiss et al. |
| 2011/0218097 A1 | 9/2011 | Rayo Mayoral et al. |
| 2011/0240517 A1 | 10/2011 | Chornet et al. |
| 2011/0277377 A1 | 11/2011 | Novak et al. |
| 2012/0018352 A1 | 1/2012 | Seki et al. |
| 2012/0103868 A1 | 5/2012 | Dindi et al. |
| 2012/0116145 A1 | 5/2012 | Bhan et al. |
| 2012/0145528 A1 | 6/2012 | Myers et al. |
| 2012/0175285 A1 | 7/2012 | Bhan et al. |
| 2012/0175286 A1 | 7/2012 | Bhan et al. |
| 2012/0181219 A1 | 7/2012 | Seki et al. |
| 2013/0037447 A1 | 2/2013 | Zimmerman |

(56) References Cited

U.S. PATENT DOCUMENTS

| | | |
|---|---|---|
| 2013/0081977 A1 | 4/2013 | Woo et al. |
| 2013/0105357 A1 | 5/2013 | Bhan |
| 2013/0105364 A1 | 5/2013 | Bhan |
| 2013/0126393 A1 | 5/2013 | Ginestra et al. |
| 2013/0171039 A1 | 7/2013 | Graham et al. |
| 2013/0186806 A1 | 7/2013 | Diehl et al. |
| 2013/0225400 A1 | 8/2013 | Liang et al. |
| 2013/0256190 A1 | 10/2013 | Van Wees et al. |
| 2013/0267409 A1 | 10/2013 | Lee et al. |
| 2013/0277273 A1 | 10/2013 | Mazyar |
| 2013/0288885 A1 | 10/2013 | Domokos et al. |
| 2013/0306517 A1 | 11/2013 | Kester et al. |
| 2013/0319910 A1 | 12/2013 | Koseoglu |
| 2014/0001089 A1 | 1/2014 | Bazer-Bachi |
| 2014/0027351 A1 | 1/2014 | Bazer-Bachi et al. |
| 2014/0061094 A1 | 3/2014 | Xu et al. |
| 2014/0073821 A1 | 3/2014 | Mitsui et al. |
| 2014/0076783 A1 | 3/2014 | Bhan |
| 2014/0097125 A1 | 4/2014 | Bazer-Bachi et al. |
| 2014/0166540 A1 | 6/2014 | Guichard et al. |
| 2014/0174980 A1 | 6/2014 | Brown et al. |
| 2014/0174983 A1 | 6/2014 | Klein et al. |
| 2014/0183098 A1 | 7/2014 | Cooper et al. |
| 2014/0183099 A1 | 7/2014 | Ginestra et al. |
| 2014/0291203 A1 | 10/2014 | Molinari et al. |
| 2014/0299515 A1* | 10/2014 | Weiss .................. C10G 65/12 208/66 |
| 2014/0305843 A1 | 10/2014 | Kraus et al. |
| 2014/0315712 A1 | 10/2014 | Smegal |
| 2014/0323779 A1 | 10/2014 | Alphazan et al. |
| 2014/0326642 A1 | 11/2014 | Tanaka et al. |
| 2014/0332444 A1* | 11/2014 | Weiss .................. C10G 65/12 208/88 |
| 2014/0353210 A1 | 12/2014 | Graham et al. |
| 2015/0057205 A1 | 2/2015 | Morishima et al. |
| 2015/0108039 A1 | 4/2015 | Bhan |
| 2015/0111726 A1 | 4/2015 | Bhan et al. |
| 2015/0144531 A1 | 5/2015 | Ginstra et al. |
| 2015/0144532 A1 | 5/2015 | He et al. |
| 2015/0217261 A1 | 8/2015 | Norling |
| 2015/0224476 A1 | 8/2015 | Plecha et al. |
| 2015/0240174 A1 | 8/2015 | Kraus et al. |
| 2015/0315480 A1 | 11/2015 | Hanks et al. |
| 2015/0321177 A1 | 11/2015 | Rana et al. |
| 2015/0337225 A1* | 11/2015 | Droubi .................. C10L 1/04 585/13 |
| 2015/0353848 A1 | 12/2015 | Patron |
| 2015/0353851 A1 | 12/2015 | Buchanan |
| 2016/0001272 A1 | 1/2016 | Daudin |
| 2016/0017240 A1 | 1/2016 | Duma et al. |
| 2016/0024396 A1 | 1/2016 | Zink et al. |
| 2016/0060549 A1 | 3/2016 | Ancheyta Juarez et al. |
| 2016/0074840 A1 | 3/2016 | Duma et al. |
| 2016/0075954 A1 | 3/2016 | Monson et al. |
| 2016/0122666 A1* | 5/2016 | Weiss .................. C10G 67/02 208/89 |
| 2016/0129428 A1 | 5/2016 | Bhan |
| 2016/0145503 A1 | 5/2016 | Xu et al. |
| 2016/0145508 A1 | 5/2016 | Xu et al. |
| 2016/0145509 A1 | 5/2016 | Mukherjee et al. |
| 2016/0152901 A1 | 6/2016 | Dufresne |
| 2016/0160139 A1* | 6/2016 | Robinson ............ C10G 45/02 208/15 |
| 2016/0177205 A1 | 6/2016 | Evans et al. |
| 2016/0200990 A1 | 7/2016 | Mori et al. |
| 2016/0220985 A1 | 8/2016 | Osaki et al. |
| 2016/0220986 A1 | 8/2016 | Osaki et al. |
| 2016/0230102 A1 | 8/2016 | Osaki et al. |
| 2016/0243528 A1 | 8/2016 | He et al. |
| 2016/0250622 A1 | 9/2016 | He et al. |
| 2016/0256856 A1 | 9/2016 | Kester et al. |
| 2016/0264887 A1 | 9/2016 | Davydov |
| 2016/0304794 A1 | 10/2016 | Majcher et al. |
| 2016/0312130 A1 | 10/2016 | Merdrignac |
| 2016/0340597 A1 | 11/2016 | Baldassar et al. |
| 2016/0348012 A1 | 12/2016 | Zhao et al. |
| 2016/0348013 A1 | 12/2016 | Ladkat et al. |
| 2016/0362615 A1 | 12/2016 | Ancheyta Juarez et al. |
| 2017/0002273 A1 | 1/2017 | Rubin-Pitel et al. |
| 2017/0002279 A1 | 1/2017 | Brown et al. |
| 2017/0009163 A1 | 1/2017 | Kraus et al. |
| 2017/0022433 A1 | 1/2017 | Brown et al. |
| 2017/0029723 A1 | 2/2017 | Bazer-Bachi et al. |
| 2017/0044451 A1 | 2/2017 | Kar et al. |
| 2017/0058205 A1 | 3/2017 | Ho et al. |
| 2017/0058223 A1 | 3/2017 | Droubi et al. |
| 2017/0066979 A1 | 3/2017 | Lei et al. |
| 2017/0073592 A1 | 3/2017 | Nonaka et al. |
| 2017/0120224 A1 | 5/2017 | Boualleg et al. |
| 2017/0120228 A1 | 5/2017 | Boualleg et al. |
| 2017/0120229 A1 | 5/2017 | Boualleg et al. |
| 2017/0121612 A1 | 5/2017 | Boualleg et al. |
| 2017/0128912 A1 | 5/2017 | Boualleg et al. |
| 2017/0136446 A1 | 5/2017 | Carati et al. |
| 2017/0137725 A1 | 5/2017 | Boualleg et al. |
| 2017/0165639 A1 | 6/2017 | Klein et al. |
| 2017/0175012 A1 | 6/2017 | Schleiffer et al. |
| 2017/0183575 A1 | 6/2017 | Rubin-Pitel et al. |
| 2017/0183582 A1 | 6/2017 | Hoehn et al. |
| 2017/0192126 A1 | 7/2017 | Koseoglu |
| 2017/0232414 A1 | 8/2017 | Hassan |
| 2017/0260463 A1 | 9/2017 | Schleiffer et al. |
| 2017/0267937 A1 | 9/2017 | Schleiffer et al. |
| 2017/0306250 A1 | 10/2017 | Ginestra |
| 2017/0306252 A1 | 10/2017 | Malek Abbaslou et al. |
| 2017/0335206 A1 | 11/2017 | Mukherjee et al. |
| 2017/0349846 A1 | 12/2017 | Ding et al. |
| 2017/0355913 A1 | 12/2017 | Mountainland et al. |
| 2017/0355914 A1 | 12/2017 | Weiss et al. |
| 2017/0362514 A1 | 12/2017 | Hanks et al. |
| 2018/0016505 A1 | 1/2018 | Matsushita |
| 2018/0104676 A1 | 4/2018 | Yamane et al. |
| 2018/0134965 A1 | 5/2018 | Brown et al. |
| 2018/0134972 A1 | 5/2018 | Brown et al. |
| 2018/0134974 A1 | 5/2018 | Weiss et al. |
| 2018/0147567 A1 | 5/2018 | Matsushita et al. |
| 2018/0154340 A1 | 6/2018 | Boualleg et al. |
| 2018/0251690 A1 | 9/2018 | Mountainland et al. |
| 2018/0291291 A1 | 10/2018 | Brown et al. |
| 2018/0371343 A1 | 12/2018 | Rubin-Patel et al. |
| 2019/0002772 A1 | 1/2019 | Moore et al. |
| 2019/0010405 A1 | 1/2019 | Moore et al. |
| 2019/0078027 A1 | 3/2019 | Deimund et al. |
| 2019/0093026 A1 | 3/2019 | Wohaibi et al. |
| 2019/0136144 A1 | 5/2019 | Wohaibi et al. |
| 2019/0185772 A1 | 6/2019 | Berkhous et al. |
| 2019/0203130 A1 | 7/2019 | Mukherjee |
| 2019/0233732 A1 | 8/2019 | Sun |
| 2019/0338203 A1 | 11/2019 | Umansky et al. |
| 2019/0338205 A1 | 11/2019 | Ackerson et al. |
| 2019/0382668 A1 | 12/2019 | Klussmann et al. |
| 2020/0123458 A1 | 4/2020 | Moore et al. |
| 2020/0199462 A1 | 6/2020 | Klussmann et al. |
| 2020/0231886 A1 | 7/2020 | Kraus et al. |
| 2020/0248080 A1 | 8/2020 | Peer et al. |
| 2020/0385644 A1 | 12/2020 | Rogel et al. |
| 2021/0024842 A1 | 1/2021 | Fruchey et al. |
| 2021/0062096 A1 | 3/2021 | Hodgkins et al. |
| 2021/0102130 A1 | 4/2021 | Marques et al. |
| 2021/0155858 A1 | 5/2021 | Koseoglu et al. |

FOREIGN PATENT DOCUMENTS

| | | |
|---|---|---|
| CA | 1248513 | 1/1989 |
| FR | 2681871 | 4/1993 |
| FR | 3011004 A | 3/2015 |
| FR | 3013723 A | 5/2015 |
| FR | 3053356 | 1/2018 |
| GB | 1324167 | 7/1973 |
| GB | 1502915 | 3/1978 |
| GB | 1504586 | 3/1978 |
| GB | 1505886 | 3/1978 |
| GB | 2124252 | 2/1984 |

(56) References Cited

FOREIGN PATENT DOCUMENTS

| | | |
|---|---|---|
| JP | 2015059220 A | 3/2015 |
| JP | 20200122450 | 8/2020 |
| RU | 2700705 | 9/2019 |
| WO | 9113951 A1 | 9/1991 |
| WO | 9820969 | 5/1998 |
| WO | 9919061 A1 | 4/1999 |
| WO | 0197971 A1 | 12/2001 |
| WO | 02062926 A2 | 8/2002 |
| WO | WO-2005028596 A1 * | 3/2005 ............ C10L 1/04 |
| WO | 2005063933 A2 | 7/2005 |
| WO | 2011071705 A2 | 6/2011 |
| WO | 2013083662 | 6/2013 |
| WO | 2014096703 A | 6/2014 |
| WO | 2014096704 A | 6/2014 |
| WO | 2014160603 A1 | 10/2014 |
| WO | 2014177424 A2 | 11/2014 |
| WO | 201534521 A1 | 3/2015 |
| WO | 2017168312 A1 | 10/2017 |
| WO | 2018075017 | 4/2018 |
| WO | 2018101244 A1 | 6/2018 |
| WO | 2018053323 A1 | 3/2019 |
| WO | 2019104243 A1 | 5/2019 |
| WO | 2019125674 A1 | 6/2019 |
| WO | 2019133880 A1 | 7/2019 |
| WO | 2019178701 A1 | 9/2019 |
| WO | 2021066265 A1 | 4/2021 |

OTHER PUBLICATIONS

James G. Speight, The Desulfurization of Heavy Oils and Residua, 2nd Ed. 1999, Chapter 6, pp. 206-253, Marcel Dekker Inc. New York NY US.

James G. Speight, The Desulfurization of Heavy Oils and Residua, 2nd Ed. 1999, Chapter 8, pp. 302-334, Marcel Dekker Inc. New York NY US.

James G. Speight, The Desulfurization of Heavy Oils and Residua, 2nd Ed. 1999, Chapter 9, pp. 335-385, Marcel Dekker Inc. New York NY US.

International Search Report issued in corresponding International Application No. PCT/US2018/017855 dated Apr. 27, 2018 (3 pages).

International Search Report issued in corresponding International Application No. PCT/US2018/017863 dated Apr. 27, 2018 (3 pages).

Tesoro Refining & Marketing Co. Material Safety Data Sheet—Fuel Oil, pp. 1-10, Jul. 26, 2012, San Antonio, Texas, US.

Tesoro Refining & Marketing Co. Material Safety Data Sheet—Marine Gas Oil, pp. 1-11, Nov. 17, 2012, San Antonio, Texas, US.

Tesoro Refining & Marketing Co. Material Safety Data Sheet—Resid pp. 1-10, Apr. 6, 2015, San Antonio, Texas, US.

Coutrymark Refining and Logistics, LLC, Material Safety Data Sheet—No. 6 Fuel Oil, Dec. 2012, pp. 1-4, Mt. Vernon, Indiana US.

Valero Marekting & Supply Company, Material Safety Data Sheet—Residual Fuel Oil, Dec. 4, 2010, pp. 1-14, San Antonio, Texas US.

Oceanbat SA. Material Safety Data Sheet—Marine Fuel Oil, Jul. 2013, pp. 1-7, Guayaquil Ecuador.

Exxonmobilcorporation, Material Safety Data Sheet—Marine Fuel Oil, pp. 1-12, Sep. 18, 2013, Fairfax Virginia US.

Shell Trading (US) Company, Material Safety Data Sheet—Ultra Low Sulfur Fuel Oil, pp. 1-21, Jun. 19, 2018, Houston, Texas US.

Suncor Energy Inc., Material Safety Data Sheet—Heating Fuel Oil Type 6 / Residual Marine Fuel, pp. 1-11, Jun. 7, 2018, Calgary Alberta Canada.

Marathon Petroleum Company LP, Material Safety Data Sheet—Marathon No. 6 Fuel Oil, Dec. 7, 2010, pp. 1-14., Findlay, Ohio US.

BP Australia Pty Ltd., Material Safety Data Sheet—BP380 Marine Fuel, Oct. 27, 2011. pages 1-6, Docklands, Victoria Australia.

U.S. Oil & Refining Co., Material Safety Data Sheet—Residual Fuel Oil, Dec. 18, 2008, pp. 1-11. Tacoma, Washington US.

American Bureau of Shipping, Publication 31 Notes On Heavy Fuel Oil, 1984, pp. 1-68, Houston Texas US.

American Bureau of Shipping, Notes Use of Low Sulphur Marine Fuel for Main and Auxiliary Diesel Engines, Jan. 1, 2010, pp. 1-68, Houston Texas US ( https://www.eagle.org/eagleExternalPortalWEB/ShowProperty/BEA%20Repository/pdfs/Regulatory/Docs/LowSulphurNote_Engine).

Shuyi Zhang, Dong Liu, Wenan Deng, Guohe Que, A Review of Slurry-Phase Hydrocracking Heavy Oil Technology, Energy & Fuels, vol. 21, No. 6, Nov. 2007, pp. 3057-3062, American Chemical Society, Washington DC US.

Peiman Pourmoghaddam, Susan Davari, Zahra Delavar Moghaddam, A Technical And Economic Assessment of Fuel Oil Hydrotreating Technology For Steam Power Plant SO2 and NOx Emissions Control, Advances in Environmental Technology vol. 2, Issue 1, Accepted Oct. 3, 2016, pp. 45-54, Iranian Research Organization For Science and Technology, Tehran Islamic Republic of Iran.

Dawoud Bahzad, Jamal Al-Fadhli, Ayyad Al-Dhafeeri, Ali Abdal, Assessment of Selected Apparent Kinetic Parameters of the HDM and HDS reactions of Two Kuwaiti Residual Oils, Using Two Types of Commercial ARDS Catalysts, Energy & Fuels, vol. 24, Jan. 8, 2010, pp. 1495-1501, American Chemical Society, Washington DC US.

A. Marafi, A. Hauser, A Stanislaus, Atmospheric Residual Desulfurization Process for Residual Oil Upgrading: An Investigation of the Effect of Catalyst Type and Operation Severity on Product Oil Quality, Energy & Fuels, vol. 20, Apr. 4, 2006, pp. 1145-1149, American Chemical Society, Washington DC US.

M.M. Boduszynki, C.E. Rechsteiner, A.S.G. Shafzadeh, R.M.K. Carlson, Composition and Properties of Heavy Crudes, No. 1998. 202 UNITAR Centre for Heavy Crude and Tar Sands, 1998, pp. 1-12, Canada.

Gard AS, Bunkers and Bunkering—A selection of articles previously published by Gard AS, Jan. 2014, pp. 1-53, Arendal Norway.

Monique B. Vermeire Everything You Need to Know About Marine Fuels, Jun. 2012, pp. 1-32, Ghent Belgium.

T.M. Saleh, H. Ismail, J.E.Corbett, R.S. Bali, Commercial Experience in the Operation of Atmospheric Residue Desulfurization Unit in Kuwait national Petroleum Company At Mina Al-Ahmadi Refinery, Catalyst in Petroleum Refining, 1989, pp. 175-189, Elsevier Science Publishers B.V., Amsterdam The Netherlands.

Victor S. Semeykina, Ekaterina V. Parkhomchuk, Alexander V. Polukhin, Pavel D. Parunin, Anton I. Lysikov, Artem B. Ayupov, Svetlana V. Cherepanova, Vladislav V. Kanazhevskiy, Vasil V. Kaichev, Tatyana S. Glazneva, Valentina V. Zvereva, CoMoNi Catalyst Texture and Surface Properties in Heavy Oil Processing. Part I: Hierarchical Macro / Mesoporous Alumina Support, Industrial & Engineering Chemistry Research, vol 55, Feb. 29, 2016, pp. 3535-3545 American Chemical Society, Washington DC US.

Victor S. Semeykina, Ekaterina V. Parkhomchuk, Alexander V. Polukhin, Pavel D. Parunin, Anton I. Lysikov, Artem B. Ayupov, Svetlana V. Cherepanova, Vladislav V. Kanazhevskiy, Vasil V. Kaichev, Tatyana S. Glazneva, Valentina V. Zvereva, CoMoNi Catalyst Texture and Surface Properties in Heavy Oil Processing. Part II: Macrpporous Sepiolite-Like Mineral, Industrial & Engineering Chemistry Research, vol. 55,Aug. 1, 2016, pp. 9129-9139 American Chemical Society, Washington DC US.

Andre Hauser, Abdulazim Marafi, Adel Almutairi, Anthony Stanislaus, Comparative Study of Hydrodemetallization (HDM) Catalyst Aging by Boscan Feed and Kuwait Atmospheric Residue, Energy & Fuels, vol. 22 Aug. 27, 2008, pp. 2952-2932, American Chemical Society, Washington DC US.

Criterion Catalysts & Technologies LP, Residue Upgrading Using Fixed-Bed Hydroconversion Product Brochue, pp. 1 & 2, downloaded Jan. 9, 2018 webpage (http://s06.static-shell.com/content/dam/royaldutchshell/documents/corporate/criterion-fixed-bedfactsheethires.pdf).

Criterion Catalysts & Technologies LP, Residue Upgrading Product Infonnation Sheet, pp. 1 & 2, Aug. 2008, Houston Texas US.

John-Laurent Tronche, Jelena Grigorjeva, Annie Siebert (editor), How Are Refiners Preparing For 2015 Marine Fuel Spec Changes?, pp. 1-2, Jun. 6, 2014, S&P Global Platts. Houston Texas US.

(56) References Cited

OTHER PUBLICATIONS

DNV GL Maritime, Hong Kong Requires Ocean-Going Vessels to Comply with 0.50% M/M Sulphur Limit While at Berth, Statutory Update No. 1, Mar. 2015, p. 1, DNV GL Maritime, Hamburg Germany.

Mike Stockle, Tina Knight, Impact of Low-Sulphur Bunkers on Refineries, Catalysis 2009, p. 1-7, www.digitalrefining.com/article/1000090, article based on presentation from the Nov. 2008 ERC Annual Meeting, Vienna Austria.

Ekaterina V. Parkhomchuk, Anton I. Lysikov, Alexey G. Okunev, Pavel D. Parunin, Victoria S. Semeikina, Artem B. Ayupov, Valentina A. Trunova, Valentin N. Parmon, Meso / Macroporous CoMo Alumina Pellets for Hydrotreating of Heavy Oil, Industrial & Engineering Chemistry Research, vol. 15 Nov. 13, 2013, pp. 17117-17125 American Chemical Society, Washington DC US.

Cristian J. Calderon Jorge Ancheyta, Modeling of Slurry-Phase Reactors for Hydrocracking of Heavy Oils, Energy & Fuels, vol. 30 Jan. 28, 2016, pp. 2525-2543, American Chemical Society, Washington DC US.

DNV GL Maritime, Notice for Low Sulphur "Hybrid" Fuel Operation, Technical Update No. 3, Mar. 2015, p. 1&2, DNV GL Maritime, Hamburg Germany.

Abdul Waheed Bhutto, Rashid Abro, Shurong Goa, Tauqeer Abbas, Xiaochun Chen, Guangren Yu, Oxidative Desulfurization of Fuel Oils Using Ionic Liquids: A Review, Journal of the Taiwan Institute of Chemical Engineers, vol. 62, Feb. 28, 2016, pp. 84-97, Elsevier B.V. Amsterdam The Netherlands.

V. Babich, J.A. Moulijn, Science and Technology of Novel Processes for Deep Desulfurization of Oil Refinery Streams: A Review, Fuel, vol. 82 , Nov. 14, 2002, pp. 607-631 Elsevier B.V. Amsterdam The Netherlands Published first on the web via fuelfirst.com—http://www.fuelfirst.com.

A. Hauser, A. Marafi, A. Stanislaus, A. Al-Adwani, Relation Between Feed Quality and Coke Formation in a Three Stage Atmospheric Residue Desulfurization (ARDS) Process, Energy & Fuels, vol. 19 Feb. 8, 2005, pp. 544-553, American Chemical Society, Washington DC US.

A Marafi, H. Al-Bazzaz, M. Al-Marri, F. Maruyama, M. Absi-Halbi, A. Stanislaus, Residual-Oil Hydrotreating Kinetics for graded Catalyst Systems: Effect of Original and Treated Feedstocks, Energy Fuels, vol. 17 (5), Jul. 2, 2003 pp. 1191-1197 American Chemical Society, Washington DC US.

Hmaza Al-Bazza, Jia-Lin Kang, Dduha Chehadeh, Dawoud Bahzad, David Shan-Hill Wong, Shi-Shang Jang, Robust Predictions of Catalyst Deactivation of Atmospheric Residual Desulfurization, Energy Fuels, vol. 29, Oct. 21, 2015 pp. 7089-7100 American Chemical Society, Washington DC US.

A.G. Okunev, E.V. Parkhomchuk, A.I. Lysikov, P.D. Parunin, V.S. Semeykina, V.N. Parmon, Catalytic Hydroprocessing of Heavy Oil Feedstocks, Russian Chemical Reviews, vol. 84, Sep. 2015, pp. 981-999, Russian Academy of Sciences and Turpion Ltd. Moscow, Russia.

Ernest Czermanski, Slawomir Drozdziecki, Maciej Matczak, Eugen Spangenberg, Bogusz Wisnicki, Suplphur Regulation—Technology Solutions and Economic Consequences, Institute of Maritime transport and Seaborne Trade, University of Gdansk, 2014, pp. 1-76, University of Gdansk, Gdansk Poland.

Charles Olsen, Brian Watkins, Greg Rosinski, The Challenges of Processing FCC LCO, Catalagram 110 Special Edition, Fall 2011, pp. 6-8, W.R. Grace & Co. Advanced Refining Technologies, Columbus Maryland, US.

Yanzi Jia, Qinghe Yang, Shuling Sun, Hong Nie, Dadong Li, The Influence of Metal Deposits on Residue Hydrodemetallization Catalyst in the Absence and Presence of Coke, Energy Fuels, vol. 30 Feb. 22, 2016 pp. 2544-2554 American Chemical Society, Washington DC US.

James G. Speight, Upgrading Heavy Oils and Residua: The Nature of the Problem, Catalysis on the Energy Scene, 1984, pp. 515-527, Elsevier Science Publishers B.V. Amsterdam, The Netherlands.

Blessing Umana, Nan Zhang, Robin Smith, Development of Vacuum Residue Hydrodesuphurization—Hydrocracking Models and Their Integration with Refinery Hydrogen Networks, Industrial & Engineering Chemistry Research, vol. 55, Jan. 27, 2016, pp. 2391-2406, American Chemical Society, Washington DC US.

Mike Stockle, Tina Knight, Impact of Low Sulphur Bunkers on Refineries, Catalysis, 2009, pp. 1-7, downloaded from website: www.digitalrefining.com/article/1000090.

*Phillips 66, Phillips 66*, Petitioner v *Magēmā Technology LLC*, Patent Owner, Petition for Inter Parties Review, Case IPR2021-01168, U.S. Pat. No. 10,308,884 B2, Dated Jul. 7, 2021, All pages.

*Phillips 66, Phillips 66*, Petitioner v *Magēmā Technology LLC*, Patent Owner, Petition for Inter Parties Review, Case IPR2021-01173, U.S. Pat. No. 10,584,287 B2, Dated Jul. 12, 2021, All pages.

*Phillips 66, Phillips 66*, Petitioner v *Magēmā Technology LLC*, Patent Owner, Petition for Inter Parties Review, Case IPR2021-01174, U.S. Pat. No. 10,604,709 B2, Dated Jul. 13, 2021, All pages.

*Phillips 66, Phillips 66*, Petitioner v *Magēmā Technology LLC*, Patent Owner, Petition for Inter Parties Review, Case IPR2021-01175, U.S. Pat. No. 10,533,141 B2, Dated Jul. 14, 2021, All pages.

International Organization for Standardization. Petroleum products—Fuels (class F)—Specifications of marine fuels (ISO Standard No. 8217:2017(E)), 2017. pp. 1-30 as presented in Petitioner's Exhibit 1003 in IPR2021-01168; IPR2021-01173; IPR2021-01174; IPR2021-01175.

Phillips 66, Petitioner's Exhibit 1015 Defendants Supplemental Preliminary Invalidity Contentions pp. 1-50, as presented in IPR2021-01168; IPR2021-01173; IPR2021-01174; IPR2021-01175.

Mafalda Silva, Life Cycle Assessment of Marine Fuel Production, Jul. 2017, Norwegian University of Science and Technology, pp. 16-18, 32-35, 66 as presented Petitioner's Exhibit 1055 in IPR2021-01168; IPR2021-01173; IPR2021-01174; IPR2021-01175 and cited in Petitioner's Exhibit 1015 in IPR2021-01168; IPR2021-01173; IPR2021-01174; IPR2021-01175.

Cambiaso Risso Group, Challenges of IMO's 0.5% Global Bunker Sulfur Cap, Dec. 12, 2016, p. 9, as presented in Petitioner's Exhibit 1057 in IPR2021-01168; IPR2021-01173; IPR2021-01174; IPR2021-01175 and cited in Petitioner's Exhibit 1015 in IPR2021-01168; IPR2021-01173; IPR2021-01174; IPR2021-01175.

Phillips 66, Petitioner's Exhibit 1082 Declaration of Edward L. Sughrue II, pp. 1-84 as presented in IPR2021-01168; IPR2021-01173; IPR2021-01174; IPR2021-01175.

Surinder Parkash, Petroleum Fuels Manufacturing Handbook, 2010, R.R Donnelley, Publisher, pp. 82, 83, 84, 94, 95, 96 as presented in Petitioner's Exhibit 1102 in IPR2021-01174.

Mohammad Farhat Ali, et al. A review of methods for the demetallization of residual fuel oils, Fuel Processing Technology, Mar. 8, 2006, pp. 573-584, vol. 87, Elsevier B.V.

Mohan S. Rana, et al., A review of recent advances on process technologies for upgrading of heavy oils and residua, Fuel, Available online Sep. 7, 2006, pp. 1216-1231, vol. 86, Elsevier B.V.

Carolina Leyva, et al., Activity and surface properties of NiMo/$SiO_2$—$Al_2O_3$ catalysts for hydroprocessing of heavy oils, Applied Catalysis A: General, Available online Feb. 28, 2012, pp. 1-12, vol. 425-426, Elsevier B.V.

Oliver C. Mullins et al., Asphaltenes Explained for the Nonchemist, Petrophysics, Jun. 2015, pp. 266-275, vol. 56, No. 3.

M. Ghasemi, et al., Phase Behavior and Viscosity Modeling of Athabasca Bitumen and Light Solvent Mixtures, SPE165416, Jun. 2013, pp. 1-26, Society of Petroleum Engineers.

Marten Ternan, Catalytic Hydrogenation and Asphaltene Conversion of Athabasca Bitumen, The Canadian Journal of Chemical Engineering, Oct. 1983, pp. 689-696, vol. 61.

Jeremi'as Marti'nez, et al.,Comparison of correlations to predict hydrotreating product properties during hydrotreating of heavy oils, Catalysis Today, Available online Dec. 5, 2009, pp. 300-307, vol. 150, Elsevier B.V.

Luis C. Castneda, et al., Current situation of emerging technologies for upgrading of heavy oils, Catalysis Today, Available online Jul. 4, 2013, pp. 248-273, vol. 220-222, Elsevier B.V.

C. Ferreira, et al., Hydrodesulfurization and hydrodemetallization of different origin vacuum residues: Characterization and reactivity,

(56) References Cited

OTHER PUBLICATIONS

FUEL, Available online Apr. 14, 2012, pp. 1-11, http://dx.doi.org/10.1016/j.fuel.2012.03.054, Elsevier B.V.
C.V. Philip, et al. GPC Characterization for Assessing Compatibility Problems with Heavy Fuel Oils, Fuel Processing Technology 1984: pp. 189-201., Elsevier B.V.
Muhammad A. Altajam & Marten Ternan, Hydrocracking of Athabasca bitumen using Co-Mo catalysts supported on wide pore carbon extrudates, FUEL, Aug. 1989, pp. 955-960, Butterworth & Co. Publishers Ltd.
J.W. Holmes & J.A. Bullin, Fuel Oil Compatibility Probed, Hydrocarbon Processing, Sep. 1983: pp. 101-103.
Charles J. Glover, & Jerry A. Bullin, Identification of Heavy Residual Oils by GC and GCMS, Journal of Environmental Science and Health A24(1), 1989: pp. 57-75.
H. Puron, et al., Kinetic analysis of vacuum residue hydrocracking in early reaction stages, FUEL, Available online Sep. 27, 2013, pp. 408-414, vol. 117, Elsevier B.V.
Yanet Villasna, et al. Upgrading and Hydrotreating of Heavy Oils and Residua, Energy Science and Technology, vol. 3, Oil and Natural Gas, 2015, pp. 304-328, Stadium Press LLC, Houston TX USA.
Patent Owner's Preliminary Response, Case IPR2021-01168, U.S. Pat. No. 10,308,884 B2, Dated Oct. 27, 2021, All pages.
Patent Owner's Preliminary Response, Case IPR2021-01173, U.S. Pat. No. 10,584,287 B2, Dated Oct. 26, 2021, All pages.
Patent Owner's Preliminary Response, Case IPR2021-01174, U.S. Pat. No. 10,604,709 B2, Dated Oct. 28, 2021, All pages.
Patent Owner's Preliminary Response, Case IPR2021-01175, U.S. Pat. No. 10,533,141 B2, Dated Oct. 28, 2021, All pages.
Decision Denying Institution of Inter Parties Review, Case IPR2021-01168, U.S. Pat. No. 10,308,884 B2, Dated Jan. 21, 2022, All pages.
Decision Denying Institution of Inter Parties Review, Case IPR2021-01173, U.S. Pat. No. 10,584,287 B2, Dated Jan. 21, 2022, All pages.
Decision Denying Institution of Inter Parties Review, Case IPR2021-01174, U.S. Pat. No. 10,604,709 B2. Dated Jan. 21, 2022, All pages.
Decision Denying Institution of Inter Parties Review, Case IPR2021-01175, U.S. Pat. No. 10,533,141 B2, Dated Jan. 21, 2022, All pages.
International Standard ISO 8217 (2017) sixth Edition Mar. 2017, Petroleum products—Fuels (classF)—Specification of marine fuels, International Organization for Standards, Downloaded Oct. 31, 2017, All pages.

\* cited by examiner

MULTI-STAGE PROCESS AND DEVICE FOR TREATMENT HEAVY MARINE FUEL OIL AND RESULTANT COMPOSITION AND THE REMOVAL OF DETRIMENTAL SOLIDS

BACKGROUND

There are two basic marine fuel types, distillate based marine fuel, and residual based marine fuel. Distillate based marine fuel, also known as Marine Gas Oil (MGO) or Marine Diesel Oil (MDO) comprises petroleum fractions separated from crude oil in a refinery via a distillation process. Gasoil (also known as medium diesel) is a petroleum distillate intermediate in boiling range and viscosity between kerosene and lubricating oil containing a mixture of C10-C19 hydrocarbons. Gasoil is used to heat homes and is used for heavy equipment such as cranes, bulldozers, generators, bobcats, tractors and combine harvesters. Generally maximizing gasoil recovery from residues is the most economic use because a refinery can crack gas oils into valuable gasoline and distillates. Diesel oils are similar to gas oils with diesel containing a mixture of C10 through C19 hydrocarbons, which include approximately 60% or more aliphatic hydrocarbons, 1-2% olefinic hydrocarbons, and 35% or less aromatic hydrocarbons. Marine Diesels may contain no over 15% residual process streams, and optionally no over 5% volume of polycyclic aromatic hydrocarbons (asphaltenes). Diesel fuels are primarily utilized as a land transport fuel and as blending component with kerosene to form aviation jet fuel.

Residual based fuels or Heavy Marine Fuel Oil (HMFO) comprises a mixture of process residues—the fractions that don't boil or vaporize even under vacuum conditions, and have an asphaltenes content between 3 and 20 percent by weight. Asphaltenes are large and complex polycyclic hydrocarbons that contribute to the fuel density, SARA properties and lubricity properties of HMFO which are desirable. Asphaltenes, however, have a propensity to form complex and waxy precipitates, especially in the presence of aliphatic (paraffinic) hydrocarbons. Once asphaltenes have precipitated out, they are notoriously difficult to re-dissolve and are described as fuel tank sludge in the marine shipping industry and marine bunker fueling industry.

Large ocean-going ships have relied upon HMFO to power large two stroke diesel engines for over 50 years. HMFO is a blend of polycyclic aromatics and residual hydrocarbons generated in the crude oil refinery process. Typical streams included in the formulation of HMFO include, but are not limited to: atmospheric tower bottoms (i.e. atmospheric residues), vacuum tower bottoms (i.e. vacuum residues) visbreaker residue, FCC Light Cycle Oil (LCO), FCC Heavy Cycle Oil (HCO) also known as FCC bottoms, FCC Slurry Oil, heavy gas oils; delayed cracker oil (DCO), polycylic aromatic hydrocarbons, De-asphalted oil (DAO); reclaimed land transport motor oils; slop oils, and minor portions (less than 20% vol.) of cutter oil, kerosene or diesel to achieve a desired viscosity. HMFO has an aromatic content higher than the marine distillate fuels noted above. The HMFO composition is complex and varies with the source of crude oil processed by the refinery and the processes utilized within the refinery to extract the most value out of a barrel of crude oil. The mixture of components is generally characterized as being viscous, high in sulfur and metal content, and high in asphaltenes making HMFO the one product of the refining process that has a per barrel value less than the feedstock crude oil itself.

Industry statistics indicate that about 90% of the HMFO sold contains 3.5 weight % sulfur. With an estimated total worldwide consumption of HMFO of approximately 300 million tons per year, the annual production of sulfur dioxide by the shipping industry is estimated to be over 21 million tons per year. Emissions from HMFO burning in ships contribute significantly to both global air pollution and local air pollution levels.

MARPOL, the International Convention for the Prevention of Pollution from Ships, as administered by the International Maritime Organization (IMO) was enacted to prevent pollution from ships. In 1997, a new annex was added to MARPOL; the Regulations for the Prevention of Air Pollution from Ships—Annex VI to minimize airborne emissions from ships and their contribution to air pollution. A revised Annex VI with tightened emissions limits on sulfur oxides, nitrogen oxides, ozone depleting substances and volatile organic compounds (SOx, NOx, ODS, VOC) was adopted in October 2008 and effective 1 Jul. 2010 (hereafter called Annex VI (revised)).

MARPOL Annex VI (revised) established a set of stringent emissions limits for vessel operations in designated Emission Control Areas (ECAs). The ECAs under MARPOL Annex VI (revised) are: i) Baltic Sea area—as defined in Annex I of MARPOL—SOx only; ii) North Sea area—as defined in Annex V of MARPOL—SOx only; iii) North American—as defined in Appendix VII of Annex VI of MARPOL—SOx, NOx and PM; and, iv) United States Caribbean Sea area—as defined in Appendix VII of Annex VI of MARPOL—SOx, NOx and PM.

Annex VI (revised) was codified in the United States by the Act to Prevent Pollution from Ships (APPS). Under the authority of APPS, the U.S. Environmental Protection Agency (the EPA), in consultation with the United States Coast Guard (USCG), promulgated regulations which incorporate by reference the full text of MARPOL Annex VI (revised). See 40 C.F.R. § 1043.100(a)(1). On Aug. 1, 2012 the maximum sulfur content of all marine fuel oils used onboard ships operating in US waters/ECA cannot exceed 1.00% wt. (10,000 ppm) and on Jan. 1, 2015 the maximum sulfur content of all marine fuel oils used in the North American ECA was lowered to 0.10% wt. (1,000 ppm). At the time of implementation, the United States government indicated that vessel operators must vigorously prepare for the 0.10% wt. (1,000 ppm) US ECA marine fuel oil sulfur standard. To encourage compliance, the EPA and USCG refused to consider the cost of compliant low sulfur fuel oil to be a valid basis for claiming that compliant fuel oil was not available for purchase. For the past five years there has been a very strong economic incentive to meet the marine industry demands for low sulfur HMFO, however technically viable solutions have not been realized. There has been an on-going and urgent demand for processes and methods for making a low sulfur HMFO compliant with ECA MARPOL Annex VI emissions requirements.

Under the revised MARPOL Annex VI, a global sulfur cap for HMFO (the primary source for Sox emissions from ships) was set at 3.50% wt. effective 1 Jan. 2012; then further reduced to 0.50% wt, effective 1 Jan. 2020. Under the global limit, all ships must use HMFO with a sulfur content of not over 0.50% wt. This regulation has been the subject of much discussion in both the marine shipping and marine fuel bunkering industry. There has been a very strong economic incentive to meet the international marine industry demands for low sulfur HMFO that is ISO 8217 compliant, however technically viable solutions have not been realized. There is an on-going and urgent demand for processes and methods for making a low sulfur HMFO ISO 8217 compliant with the global MARPOL Annex VI emissions requirements.

Primary Control Solutions:

A focus for compliance with the MARPOL requirements has been on primary control solutions for reducing the sulfur levels in marine fuel components prior to combustion based on the substitution of HMFO with alternative fuels. Because of the potential risks to ships propulsion systems (i.e. fuel systems, engines, etc.) when a ship switches fuel, the conversion process must be done safely and effectively to avoid any technical issues. However, each alternative fuel has both economic and technical difficulties adapting to the decades of shipping infrastructure and bunkering systems based upon HMFO utilized by the marine shipping industry.

Replacement of Heavy Fuel Oil with Marine Gas Oil or Marine Diesel:

A third proposed primary solution is to simply replace HMFO with marine gas oil (MGO) or marine diesel (MDO). The first major difficulty is the constraint in global supply of distillate materials that make up over 90% vol of MGO and MDO. It is reported that the effective spare capacity to produce MGO is less than 100 million metric tons per year resulting in an annual shortfall in marine fuel of over 200 million metric tons per year. Refiners not only lack the capacity to increase the production of MGO, but they have no economic motivation because higher value and higher margins can be obtained from ultra-low sulfur diesel fuel for land-based transportation systems (i.e. trucks, trains, mass transit systems, heavy construction equipment, etc.). A distillate only solution also ignores the economic impacts of disposing of the refinery streams that previously went to the high sulfur HMFO blending pool.

Blending:

Another primary solution is the blending of HMFO with lower sulfur containing fuels such as low sulfur marine diesel (0.1% wt. sulfur) to achieve a Product HMFO with a sulfur content of 0.5% wt. In a theoretical straight blending approach (based on linear blending) every 1 ton of HSFO (3.5% sulfur) requires 7.5 tons of MGO or MDO material with 0.1% wt. S to achieve a sulfur level of 0.5% wt. HMFO. One of skill in the art of fuel blending will immediately understand that blending large volumes of distillate into high sulfur HMFO hurts key properties of the HMFO, specifically lubricity, viscosity and density are substantially altered. Further a blending process may create a fuel that is unstable and incompatible with other blends of distillate and HMFO. A blended fuel is likely to result in the precipitation of asphaltenes and/or waxing out of highly paraffinic materials from the distillate material forming an intractable fuel tank sludge. Such a risk to the primary propulsion system is not acceptable for a cargo ship in the open ocean.

Processing of Residual Oils.

For the past several decades, the focus of refining industry research efforts related to the processing of heavy oils (crude oils, distressed oils, or residual oils) has been on upgrading the properties of these low value refinery process oils to create lighter oils with greater value. The challenge has been that crude oil, distressed oil and residues can be unstable and contain high levels of sulfur, nitrogen, phosphorous, metals (especially vanadium and nickel) and asphaltenes. Much of the nickel and vanadium is in difficult to remove chelates with porphyrins. Vanadium and nickel porphyrins and other metal organic compounds are responsible for catalyst contamination and corrosion problems in the refinery. The sulfur, nitrogen, and phosphorous, are removed because they are well-known poisons for the precious metal (platinum and palladium) catalysts utilized in the processes downstream of the atmospheric or vacuum distillation towers.

The difficulties treating atmospheric or vacuum residual streams has been known for many years and has been the subject of considerable research and investigation. Numerous residue-oil conversion processes have been developed in which the goals are same, 1) create a more valuable, preferably distillate range hydrocarbon product; and 2) concentrate the contaminates such as sulfur, nitrogen, phosphorous, metals and asphaltenes into a form (coke, heavy coker residue, FCC slurry oil) for removal from the refinery stream. Well known and accepted practice in the refining industry is to increase the reaction severity (elevated temperature and pressure) to produce hydrocarbon products that are lighter and more purified, increase catalyst life times and remove sulfur, nitrogen, phosphorous, metals and asphaltenes from the refinery stream.

In summary, since the announcement of the MARPOL standards reducing the global levels of sulfur in HMFO, refiners of crude oil have been unsuccessful in their technical efforts to create a process for the production of a low sulfur substitute for HMFO. Despite the strong governmental and economic incentives and needs of the international marine shipping industry, refiners have little economic reason to address the removal of environmental contaminates from HMFOs. The global refining industry has been focused upon generating greater value from each barrel of oil by creating light hydrocarbons (i.e. diesel and gasoline) and concentrating the environmental contaminates into increasingly lower value streams (i.e. residues) and products (petroleum coke, HMFO). Shipping companies have focused on short term solutions, such as the installation of scrubbing units, or adopting the limited use of more expensive low sulfur marine diesel and marine gas oils as a substitute for HMFO. On the open seas, most if not all major shipping companies continue to utilize the most economically viable fuel, that is HMFO. There remains a long standing and unmet need for processes and devices that remove the environmental contaminants (i.e. sulfur, nitrogen, phosphorous, metals especially vanadium and nickel) from HMFO without altering the qualities and properties that make HMFO the most economic and practical means of powering ocean going vessels.

SUMMARY

It is a general objective to reduce the environmental contaminates and Detrimental Solids from a Heavy Marine Fuel Oil (HMFO) in a multi stage process that minimizes the changes in the desirable properties of the HMFO and minimizes the unnecessary production of by-product hydrocarbons (i.e. light hydrocarbons having C1-C4 and wild naphtha (C5-C20)).

A first aspect and illustrative embodiment encompasses a multi-stage process for reducing the environmental contaminants and Detrimental Solids in a Feedstock Heavy Marine Fuel Oil, the process involving: contacting a Feedstock Heavy Marine Fuel Oil with a Detrimental Solids Removal Unit (DSRU) to give a pre-treated Feedstock Heavy Marine Fuel Oil; mixing a quantity of the pre-treated Feedstock Heavy Marine Fuel Oil with a quantity of Activating Gas mixture to give a Feedstock Mixture; contacting the Feedstock Mixture with one or more catalysts under desulfurizing conditions to form a Process Mixture from the Feedstock Mixture; receiving the Process Mixture and separating the Product Heavy Marine Fuel Oil liquid components of the Process Mixture from the gaseous components and by-product hydrocarbon components of the Process Mixture and, discharging the Product Heavy Marine Fuel Oil.

A second aspect and illustrative embodiment encompasses a device for reducing environmental contaminants and Detrimental Solids in a Feedstock HMFO and producing a Product HMFO. The illustrative devices embody the above illustrative processes on a commercial scale.

A third aspect and illustrative embodiment encompasses a Heavy Marine Fuel Oil composition resulting from the above illustrative processes.

DETAILED DESCRIPTION

The inventive concepts as described herein utilize terms that should be well known to one of skill in the art, however certain terms are utilized having a specific intended meaning and these terms are defined below:

Heavy Marine Fuel Oil (HMFO) is a petroleum product fuel compliant with the ISO 8217 (2017) standards for the bulk properties of residual marine fuels except for the concentration levels of the Environmental Contaminates.

Detrimental Solids are suspended solid particulate materials present in the HMFO having a diameter in the range of 1000 microns to 0.1 microns.

Environmental Contaminates are organic and inorganic components of HMFO that result in the formation of $SO_x$, $NO_x$ and particulate materials upon combustion.

Feedstock HMFO is a petroleum product fuel compliant with the ISO 8217 (2017) standards for the bulk properties of residual marine fuels except for the concentration of Environmental Contaminates, preferably the Feedstock HMFO has a sulfur content greater than the global MARPOL standard of 0.5% wt. sulfur, and preferably and has a sulfur content (ISO 14596 or ISO 8754) between the range of 5.0% wt. to 1.0% wt.

Product HMFO is a petroleum product fuel compliant with the ISO 8217 (2017) standards for the bulk properties of residual marine fuels and achieves a sulfur content lower than the global MARPOL standard of 0.5% wt. sulfur (ISO 14596 or ISO 8754), and preferably a maximum sulfur content (ISO 14596 or ISO 8754) between the range of 0.05% wt. to 1.0% wt.

Activating Gas: is a mixture of gases utilized in the process combined with the catalyst to remove the environmental contaminates from the Feedstock HMFO.

Fluid communication: is the capability to transfer fluids (either liquid, gas or combinations thereof, which might have suspended solids) from a first vessel or location to a second vessel or location, this may encompass connections made by pipes (also called a line), spools, valves, intermediate holding tanks or surge tanks (also called a drum).

Merchantable quality: is a level of quality for a residual marine fuel oil so the fuel is fit for the ordinary purpose it should serve (i.e. serve as a residual fuel source for a marine ship) and can be commercially sold as and is fungible with heavy or residual marine bunker fuel.

Bbl or bbl: is a standard volumetric measure for oil; 1 bbl=0.1589873 $m^3$; or 1 bbl=158.9873 liters; or 1 bbl=42.00 US liquid gallons.

Bpd: is an abbreviation for Bbl per day.

SCF: is an abbreviation for standard cubic foot of a gas; a standard cubic foot (at 14.73 psi and 60° F.) equals 0.0283058557 standard cubic meters (at 101.325 kPa and 15° C.).

Figure 1:
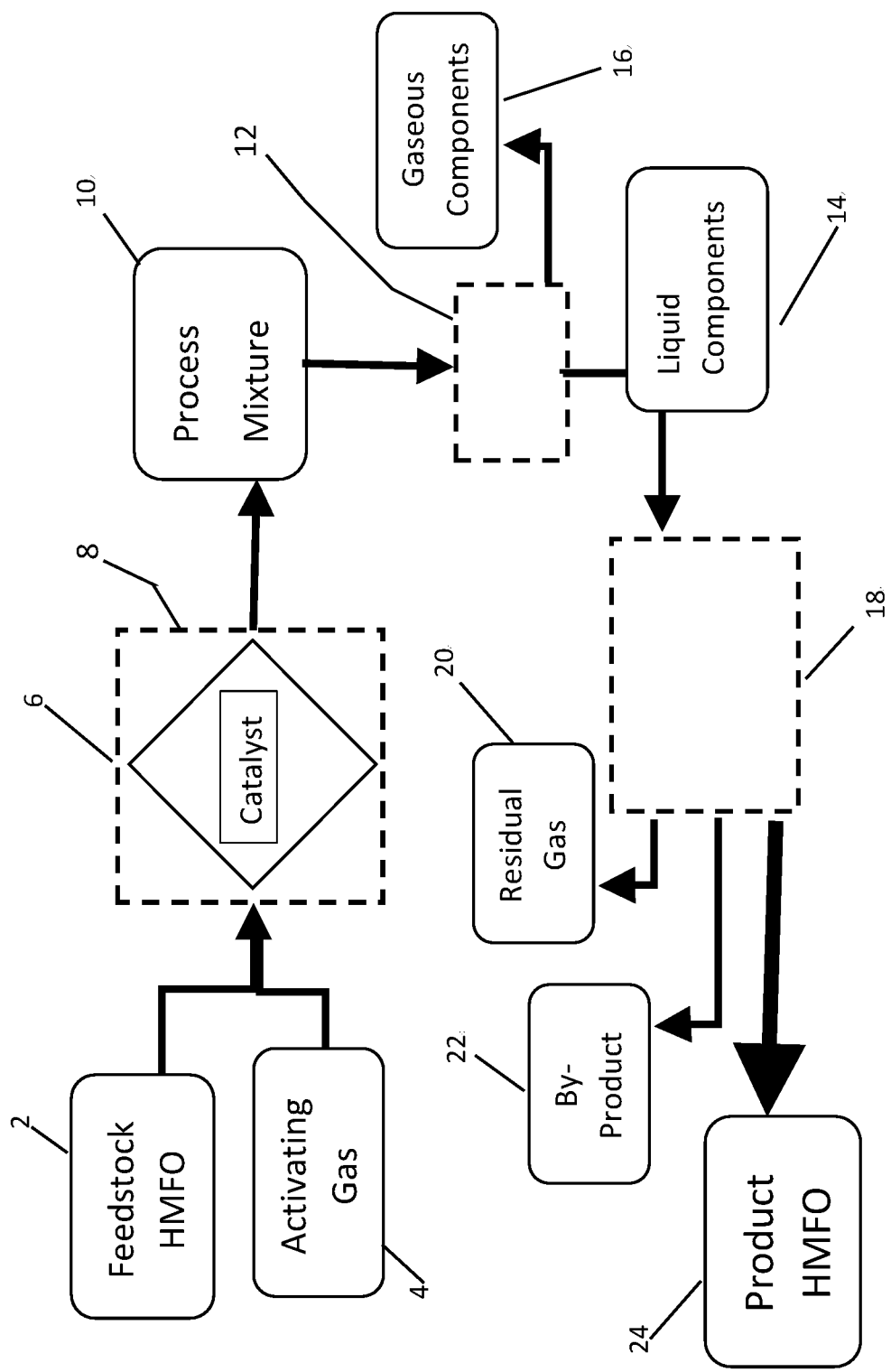
FIG. 1 is a process block flow diagram of an illustrative core process to produce Product HMFO.

The inventive concepts are illustrated in more detail in this description referring to the drawings, in which FIG. 1 shows the generalized block process flows for a core process of reducing the environmental contaminates in a Feedstock HMFO and producing a Product HMFO. A predetermined volume of Feedstock HMFO (2) is mixed with a predetermined quantity of Activating Gas (4) to give a Feedstock Mixture. The Feedstock HMFO utilized generally complies with the bulk physical and certain key chemical properties for a residual marine fuel oil otherwise compliant with ISO 8217 (2017) exclusive of the Environmental Contaminates. More particularly, when the Environmental Contaminate is sulfur, the concentration of sulfur in the Feedstock HMFO may be between the range of 5.0% wt. to 1.0% wt. The Feedstock HMFO should have bulk physical properties required of an ISO 8217 (2017) compliant HMFO. This includes having bulk properties of: a kinematic viscosity at 50° C. (ISO 3104) between the range from 180 $mm^2$/s to 700 $mm^2$/s; a density at 15° C. (ISO 3675) between the range of 991.0 $kg/m^3$ to 1010.0 $kg/m^3$; a CCAI in the range of 780 to 870; a flash point (ISO 2719) no lower than 60° C. Properties of the Feedstock HMFO connected to the formation of particulate material (PM) include: a maximum total sediment—aged (ISO 10307-2) of less than 0.10% wt. and a maximum carbon residue—micro method (ISO 10370) less than 20% wt. and preferably less than 18% wt and an aluminum plus silicon (ISO 10478) content less than 60 mg/kg. Environmental Contaminates other than sulfur that may be present in the Feedstock HMFO over the ISO requirements may include vanadium, nickel, iron, aluminum and silicon substantially reduced by the process of the present invention. However, one of skill in the art will appreciate that the vanadium content serves as a general indicator of these other Environmental Contaminates. In one preferred embodiment the vanadium content is ISO compliant so the Feedstock MHFO has a vanadium content (ISO 14597) between the range from 350 mg/kg to 450 ppm mg/kg.

As for the properties of the Activating Gas, the Activating Gas should be selected from mixtures of nitrogen, hydrogen, carbon dioxide, gaseous water, and methane. The mixture of gases within the Activating Gas should have an ideal gas partial pressure of hydrogen ($p_{H2}$) greater than 80% of the total pressure of the Activating Gas mixture (P) and more preferably wherein the Activating Gas has an ideal gas partial pressure of hydrogen ($p_{H2}$) greater than 90% of the total pressure of the Activating Gas mixture (P). It will be appreciated by one of skill in the art that the molar content of the Activating Gas is another criteria the Activating Gas should have a hydrogen mole fraction in the range between 80% and 100% of the total moles of Activating Gas mixture.

The Feedstock Mixture (i.e. mixture of Feedstock HMFO and Activating Gas) is brought up to the process conditions of temperature and pressure and introduced into a first vessel, preferably a reactor vessel, so the Feedstock Mixture is then contacted with one or more catalysts (8) to form a Process Mixture from the Feedstock Mixture.

The core process reactive conditions are selected so the ratio of the quantity of the Activating Gas to the quantity of Feedstock HMFO is 250 scf gas/bbl of Feedstock HMFO to 10,000 scf gas/bbl of Feedstock HMFO; and preferably between 2000 scf gas/bbl of Feedstock HMFO 1 to 5000 scf gas/bbl of Feedstock HMFO more preferably between 2500 scf gas/bbl of Feedstock HMFO to 4500 scf gas/bbl of Feedstock HMFO. The process conditions are selected so the total pressure in the first vessel is between of 250 psig and 3000 psig; preferably between 1000 psig and 2500 psig, and more preferably between 1500 psig and 2200 psig. The process reactive conditions are selected so the indicated temperature within the first vessel is between of 500° F. to 900° F., preferably between 650° F. and 850° F. and more preferably between 680° F. and 800° F. The process conditions are selected so the liquid hourly space velocity within the first vessel is between 0.05 oil/hour/m$^3$ catalyst and 1.0 oil/hour/m$^3$ catalyst; preferably between 0.08 oil/hour/m$^3$ catalyst and 0.5 oil/hour/m$^3$ catalyst; and more preferably between 0.1 oil/hour/m$^3$ catalyst and 0.3 oil/hour/m$^3$ catalyst to achieve deep desulfurization with product sulfur levels below 0.1 ppmw.

One of skill in the art will appreciate that the core process reactive conditions are determined to consider the hydraulic capacity of the unit. Exemplary hydraulic capacity for the treatment unit may be between 100 bbl of Feedstock HMFO/day and 100,000 bbl of Feedstock HMFO/day, preferably between 1000 bbl of Feedstock HMFO/day and 60,000 bbl of Feedstock HMFO/day, more preferably between 5,000 bbl of Feedstock HMFO/day and 45,000 bbl of Feedstock HMFO/day, and even more preferably between 10,000 bbl of Feedstock HMFO/day and 30,000 bbl of Feedstock HMFO/day.

The core process may utilize one or more catalyst systems selected from the group consisting of: an ebulliated bed supported transition metal heterogeneous catalyst, a fixed bed supported transition metal heterogeneous catalyst, and a combination of ebulliated bed supported transition metal heterogeneous catalysts and fixed bed supported transition metal heterogeneous catalysts. One of skill in the art will appreciate that a fixed bed supported transition metal heterogeneous catalyst will be the technically easiest to implement and is preferred. The transition metal heterogeneous catalyst comprises a porous inorganic oxide catalyst carrier and a transition metal catalyst. The porous inorganic oxide catalyst carrier is at least one carrier selected from the group consisting of alumina, alumina/boria carrier, a carrier containing metal-containing aluminosilicate, alumina/phosphorus carrier, alumina/alkaline earth metal compound carrier, alumina/titania carrier and alumina/zirconia carrier. The transition metal component of the catalyst is one or more metals selected from the group consisting of group 6, 8, 9 and 10 of the Periodic Table. In a preferred and illustrative embodiment, the transition metal heterogeneous catalyst is a porous inorganic oxide catalyst carrier and a transition metal catalyst, in which the preferred porous inorganic oxide catalyst carrier is alumina and the preferred transition metal catalyst is Ni—Mo, Co—Mo, Ni—W or Ni—Co—Mo.

The Process Mixture (10) in this core process is removed from the first vessel (8) and from being in contact with the one or more catalyst materials and is sent via fluid communication to a second vessel (12), preferably a gas-liquid separator or hot separators and cold separators, for separating the liquid components (14) of the Process Mixture from the bulk gaseous components (16) of the Process Mixture. The gaseous components (16) are treated beyond the battery limits of the immediate process. Such gaseous components may include a mixture of Activating Gas components and lighter hydrocarbons (mostly methane, ethane and propane but some wild naphtha) that may have been formed as part of the by-product hydrocarbons from the process.

The Liquid Components (16) in this core process are sent via fluid communication to a third vessel (18), preferably a fuel oil product stripper system, for separating any residual gaseous components (20) and by-product hydrocarbon components (22) from the Product HMFO (24). The residual gaseous components (20) may be a mixture of gases selected from the group consisting of: nitrogen, hydrogen, carbon dioxide, hydrogen sulfide, gaseous water, C1-C5 hydrocarbons. This residual gas is treated outside of the battery limits of the immediate process, combined with other gaseous components (16) removed from the Process Mixture (10) in the second vessel (12). The liquid by-product hydrocarbon component, which are condensable hydrocarbons formed in the process (22) may be a mixture selected from the group consisting of C4-C20 hydrocarbons (wild naphtha) (naphtha—diesel) and other condensable light liquid (C4-C8) hydrocarbons that can be utilized as part of the motor fuel blending pool or sold as gasoline and diesel blending components on the open market. These liquid by-product hydrocarbons should be less than 15% wt, preferably less than 5% wt. and more preferably less than 3% wt. of the overall process mass balance.

The Product HMFO (24) resulting from the core process is discharged via fluid communication into storage tanks beyond the battery limits of the immediate process. The Product HMFO complies with ISO 8217 (2017) and has a sulfur content (ISO 14596 or ISO 8754) between the range of 0.05 mass % to 1.0 mass % preferably a sulfur content (ISO 14596 or ISO 8754) between the range of 0.05 mass % ppm and 0.7 mass % and more preferably a sulfur content (ISO 14596 or ISO 8754) between the range of 0.1 mass % and 0.5 mass %. The vanadium content of the Product HMFO is also ISO compliant with a maximum vanadium content (ISO 14597) between the range from 350 mg/kg to 450 ppm mg/kg, preferably a vanadium content (ISO 14597) between the range of 200 mg/kg and 300 mg/kg and more preferably a vanadium content (ISO 14597) less than 50 mg/kg.

The Product HFMO should have bulk physical properties that are ISO compliant of: a kinematic viscosity at 50° C. (ISO 3104) between the range from 180 mm$^2$/s to 700 mm$^2$/s; a density at 15° C. (ISO 3675) between the range of 991.0 kg/m$^3$ to 1010.0 kg/m$^3$; a CCAI in the range of 780 to 870; a flash point (ISO 2719) no lower than 60° C.; a total sediment—aged (ISO 10307-2) of less than 0.10% wt.; a carbon residue—micro method (ISO 10370) less than 20.00% wt. The Product HMFO will have a sulfur content (ISO 14596 or ISO 8754) between 1% and 20% of the maximum sulfur content of the Feedstock Heavy Marine Fuel Oil. That is the sulfur content of the Product will be reduced by about 80% or greater when compared to the Feedstock HMFO. Similarly, the vanadium content (ISO 14597) of the Product Heavy Marine Fuel Oil is between 1% and 20% of the maximum vanadium content of the Feedstock Heavy Marine Fuel Oil. One of skill in the art will appreciate that the above data indicates a substantial reduction in sulfur and vanadium content indicate a process having achieved a substantial reduction in the Environmental Contaminates from the Feedstock HMFO while maintaining the desirable properties of an ISO 8217 compliant HMFO.

As a side note, the residual gaseous component is a mixture of gases selected from the group consisting of: nitrogen, hydrogen, carbon dioxide, hydrogen sulfide, gaseous water, C1-C5 hydrocarbons. An amine scrubber will effectively remove the hydrogen sulfide content which can then be processed using technologies and processes well known to one of skill in the art. In one preferable illustrative embodiment, the hydrogen sulfide is converted into elemental sulfur using the well-known Claus process. An alternative embodiment utilizes a proprietary process for conversion of the Hydrogen sulfide to hydrosulfuric acid. Either way, the sulfur is removed from entering the environment prior to combusting the HMFO in a ships engine. The cleaned gas can be vented, flared or more preferably recycled back for use as Activating Gas.

Detrimental Solids Removal Process:

It will be appreciated by one of skill in the art, that the conditions utilized in the core process have been intentionally selected to minimize cracking of hydrocarbons, but remove significant levels of sulfur from the Feedstock HMFO. However, one of skill in the art will also appreciate there may be certain Detrimental Solids present in the Feedstock HMFO removal of which would have a positive impact upon the desirable bulk properties of the Product HMFO. These processes and systems must achieve this without substantially altering the desirable bulk properties (i.e. compliance with ISO 8217 (2017) exclusive of sulfur content) of the Product HMFO.

Figure 2:
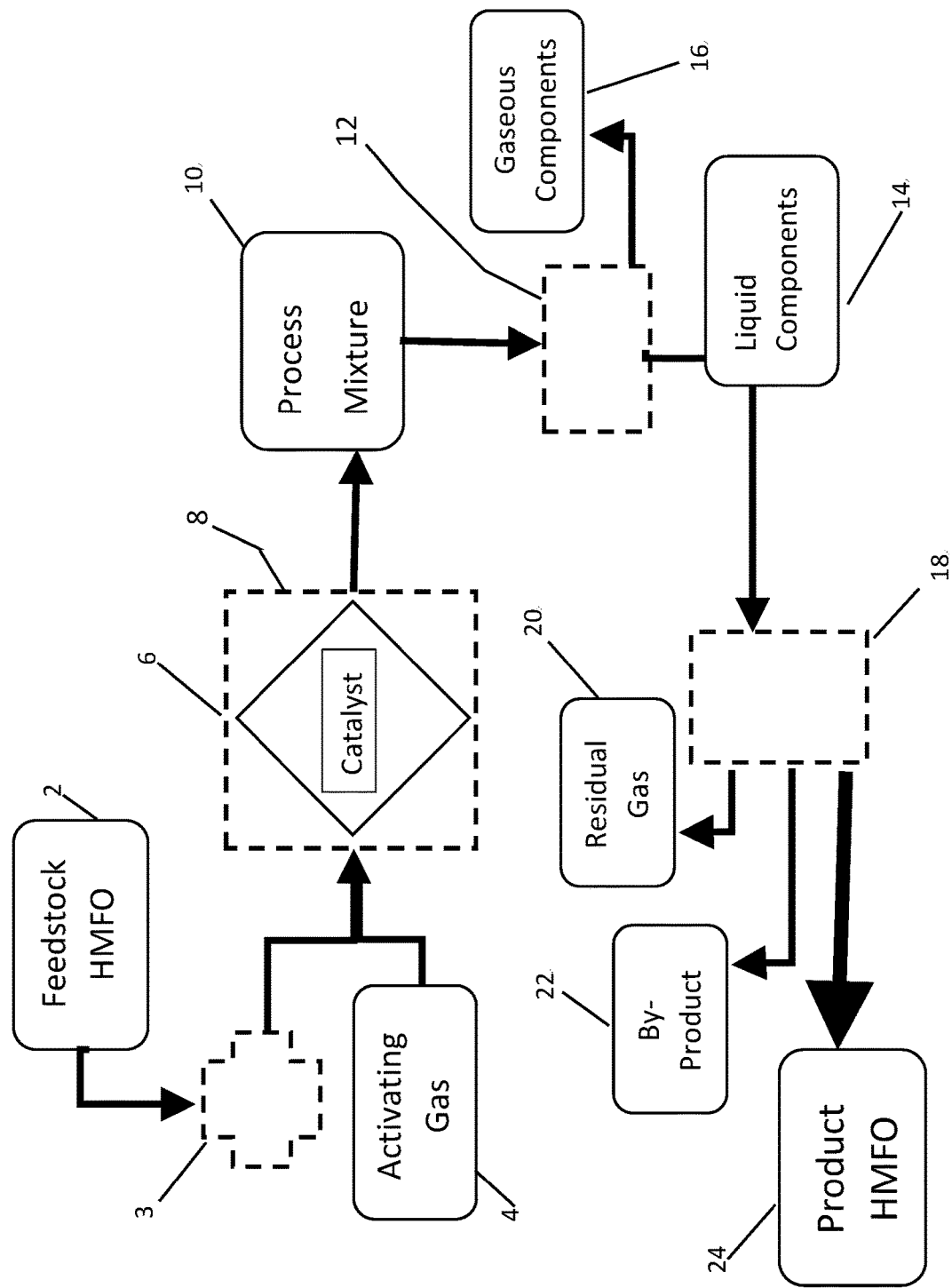
FIG. 2 is a process flow diagram of a multistage process utilizing a Detrimental Solids removal unit to pre-treat the feedstock HMFO and a subsequent core process to produce Product HMFO.
Figure 3:
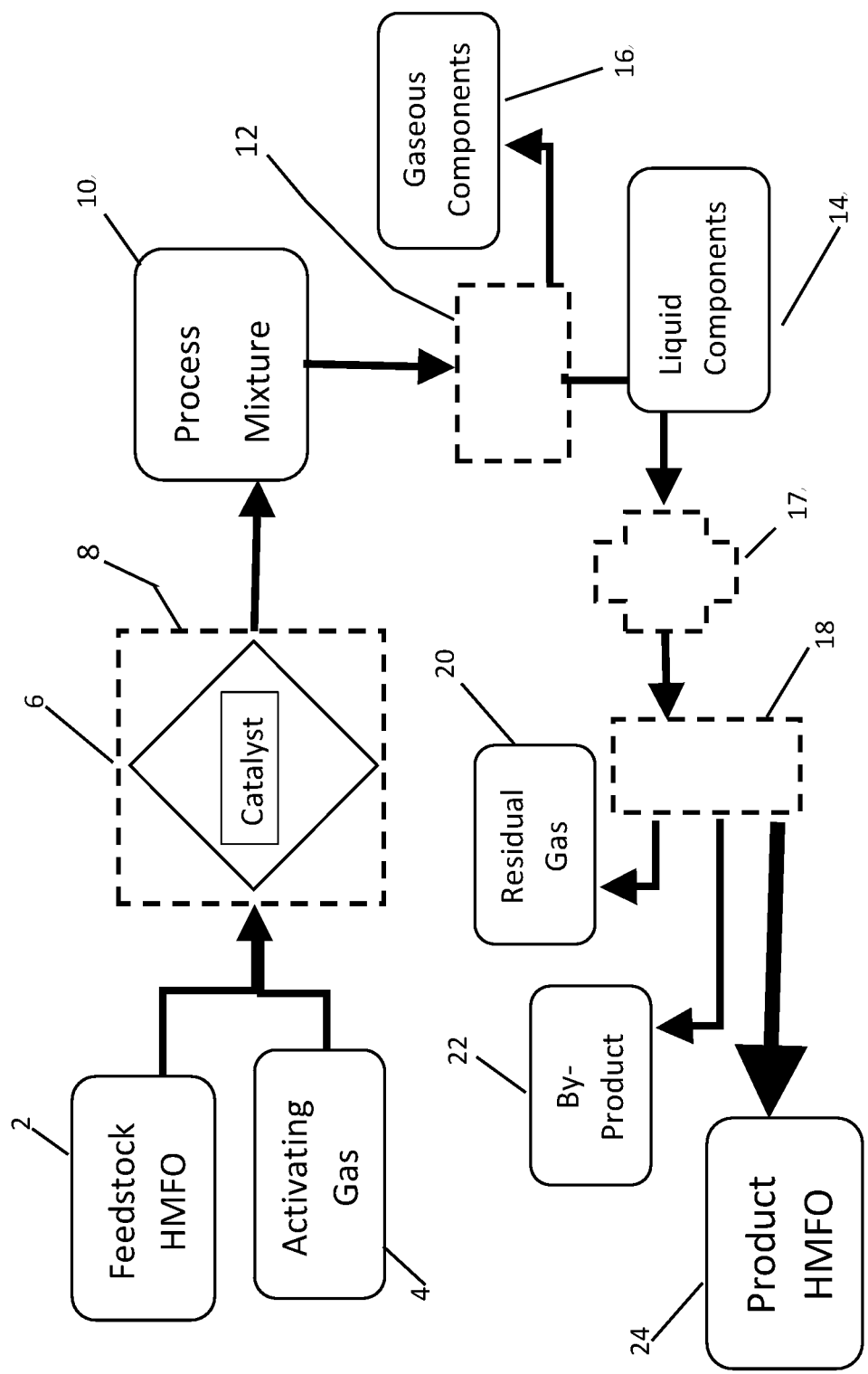
FIG. 3 is a diagram illustrating the details of a Detrimental Solids removal unit

The Detrimental Solids removal unit (DSRU) itself may be stand alone or it may be incorporated into the reactor vessel as guard bed. When incorporated into a reactor vessel, the DSRU may be one or more densely packed beds of inert catalyst material or other solids that act as filter media. As a stand alone unit, the DSRU may be a reactor vessel with multiple densely packed beds of filtering materials such as inert catalysts or it may be as described in U.S. Pat. No. 5,074,989 which comprises a filtration module with a plurality of filtration barriers aligned the length of the filtration cell. The filtrate is that portion of the feedstock passing through the filtration barriers, preferably from interior to exterior driven by a pressure drop across the filtration barriers. The filtration barriers may be mineral based filtration barriers such as those disclosed in U.S. Pat. No. 5,074,989, or they may be porous sintered metal filters or a combination of the two. The porosity of the filtration barriers is characterized by the permeametric radii of the pores. This reflects size of pores and the diameter of particles that can transit the filtration barrier. Commercially available mineral barriers having a permeametric radii from 2-100 nm (ultrafiltration) and 0.1-100 microns (microfiltration) will be useful. One of skilled in the art will also appreciate that staging the filtration barriers so the HMFO is first microfiltered followed by ultrafiltration will prolong the life of the filter and maximize the efficiency of the DSRU. Construction of a DSRU, which may operate at relatively pressures lower than 2 MPa, and temperatures equal to or lower than 300° C., adopted in this process would not present technical difficulties for an experienced technician in this field In this description, items already described above as part of the core process have retained the same numbering and designation for ease of description. As show in FIG. 2, a DSRU 3 can be utilized to pre-treat the Feedstock HMFO prior to mixing with the Activating Gas 4 as part of the core process disclosed above. While simplistically represented in this drawing, the DSRU 3 may be multiple parallel or in series DSRUs however the DSRU may be as simple as a single reactor vessel in which the HMFO is filtered through a bed of inert or inactive catalyst materials prior to exposure to the reactors containing active catalyst materials. While a single fixed bed, flow through/contact vessel may be used, it may be advantageous and it is preferable to have multiple contact vessels in parallel with each other to allow for one unit to be active while a second or third unit are being reloaded. Such an arrangement involving multiple parallel contact vessels with pipes/switching valves, etc. . . . is well within the abilities of one of skill in the art of refinery process design and operation.

Product HMFO The Product HFMO resulting from the disclosed illustrative process is of merchantable quality for sale and use as a heavy marine fuel oil (also known as a residual marine fuel oil or heavy bunker fuel) and exhibits the bulk physical properties required for the Product HMFO to be an ISO compliant (i.e. ISO8217:2017) residual marine fuel oil. The Product HMFO will exhibit bulk properties of: a kinematic viscosity at 50° C. (ISO 3104) between the range from 180 mm$^2$/s to 700 mm$^2$/s; a density at 15° C. (ISO 3675) between the range of 991.0 kg/m$^3$ to 1010.0 kg/m$^3$; a CCAI in the range of 780 to 870; a flash point (ISO 2719) no lower than 60° C.; a total sediment—aged (ISO 10307-2) of less than 0.10% wt.; a carbon residue—micro method (ISO 10370) less than 20.00% wt. and preferably less than 18%, and a aluminum plus silicon (ISO 10478) content less than 60 mg/kg.

The Product HMFO has a sulfur content (ISO 14596 or ISO 8754) less than 0.5 wt % and preferably less than 0.1% wt. and complies with the IMO Annex VI (revised) requirements for a low sulfur and preferably an ultra-low sulfur HMFO. That is the sulfur content of the Product HMFO has been reduced by about 80% or greater when compared to the Feedstock HMFO. Similarly, the vanadium content (ISO 14597) of the Product Heavy Marine Fuel Oil is less than 20% and more preferably less than 1% of the maximum vanadium content of the Feedstock Heavy Marine Fuel Oil. One of skill in the art will appreciate that a substantial reduction in sulfur and vanadium content of the Feedstock HMFO indicates a process having achieved a substantial reduction in the Environmental Contaminates from the Feedstock HMFO; of equal importance is this has been achieved while maintaining the desirable properties of an ISO 8217 (2017) compliant HMFO.

The Product HMFO not only complies with ISO 8217 (2017) (and is merchantable as a residual marine fuel oil or bunker fuel), the Product HMFO has a maximum sulfur content (ISO 14596 or ISO 8754) between the range of 0.05% wt. to 1.0% wt. preferably a sulfur content (ISO 14596 or ISO 8754) between the range of 0.05% wt. ppm and 0.5% wt. and more preferably a sulfur content (ISO 14596 or ISO 8754) between the range of 0.1% wt. and 0.5% wt. The vanadium content of the Product HMFO is well within the maximum vanadium content (ISO 14597) required for an ISO 8217 (2017) residual marine fuel oil exhibiting a vanadium content lower than 450 ppm mg/kg, preferably a vanadium content (ISO 14597) lower than 300 mg/kg and more preferably a vanadium content (ISO 14597) less than 50 mg/kg.

One knowledgeable in the art of marine fuel blending, bunker fuel formulations and the fuel logistical requirements for marine shipping fuels will readily appreciate that without further compositional changes or blending, the Product HMFO can be sold and used as a low sulfur MARPOL Annex VI compliant heavy (residual) marine fuel oil that is a direct substitute for the high sulfur heavy (residual) marine fuel oil or heavy bunker fuel currently in use. One illustrative embodiment is an ISO 8217 (2017) compliant low sulfur heavy marine fuel oil comprising (and preferably consisting essentially of) a hydroprocessed ISO 8217 (2017) compliant high sulfur heavy marine fuel oil, wherein the sulfur levels of the hydroprocessed ISO 8217 (2017) compliant high sulfur heavy marine fuel oil is greater than 0.5% wt. and wherein the sulfur levels of the ISO 8217 (2017) compliant low sulfur heavy marine fuel oil is less than 0.5% wt. Another illustrative embodiment is an ISO 8217 (2017) compliant ultra-low sulfur heavy marine fuel oil comprising (and preferably consisting essentially of) a 100% hydroprocessed ISO 8217 (2017) compliant high sulfur heavy marine fuel oil, wherein the sulfur levels of the hydroprocessed ISO 8217 (2017) compliant high sulfur heavy marine fuel oil is greater than 0.5% wt. and wherein the sulfur levels of the ISO 8217 (2017) compliant low sulfur heavy marine fuel oil is less than 0.1% wt.

Because of the present invention, multiple economic and logistical benefits to the bunkering and marine shipping industries can be realized. The benefits include minimal changes to the existing heavy marine fuel bunkering infrastructure (storage and transferring systems); minimal changes to shipboard systems are needed to comply with emissions requirements of MARPOL Annex VI no additional training or certifications for crew members will be needed, amongst the realizable benefits. Refiners will also realize multiple economic and logistical benefits, including: no need to alter or rebalance the refinery operations and product streams to meet a new market demand for low sulfur or ultralow sulfur HMFO; no additional units are needed in the refinery with additional hydrogen or sulfur capacity because the illustrative process can be conducted as a stand-alone unit; refinery operations can remain focused on those products that create the greatest value from the crude oil received (i.e. production of petrochemicals, gasoline and distillate (diesel); refiners can continue using the existing slates of crude oils without having to switch to sweeter or lighter crudes to meet the environmental requirements for HMFO products.

Heavy Marine Fuel Composition

One aspect of the present inventive concept is a fuel composition comprising, but preferably consisting essentially of, the Product HMFO resulting from the processes disclosed, and may optionally include Diluent Materials. The bulk properties of the Product HMFO itself complies with ISO 8217 (2017) and meets the global IMO Annex VI requirements for maximum sulfur content (ISO 14596 or ISO 8754). If ultra low levels of sulfur are desired, the process of the present invention achieves this and one of skill in the art of marine fuel blending will appreciate that a low sulfur or ultra-low sulfur Product HMFO can be utilized as a primary blending stock to form a global IMO Annex VI compliant low sulfur Heavy Marine Fuel Composition. Such a low sulfur Heavy Marine Fuel Composition will comprise (and preferably consist essentially of): a) the Product HMFO and b) Diluent Materials. In one embodiment, the majority of the volume of the Heavy Marine Fuel Composition is the Product HMFO with the balance of materials being Diluent Materials. Preferably, the Heavy Marine Fuel Composition is at least 75% by volume, preferably at least 80% by volume, more preferably at least 90% by volume, and furthermore preferably at least 95% by volume Product HMFO with the balance being Diluent Materials.

Diluent Materials may be hydrocarbon or non-hydrocarbon based materials mixed into or combined with or added to, or solid particle materials suspended in, the Product HMFO. The Diluent Materials may intentionally or unintentionally alter the composition of the Product HMFO but not so the resulting mixture violates the ISO 8217 (2017) standards for the bulk properties of residual marine fuels or fails to have a sulfur content lower than the global MARPOL standard of 0.5% wt. sulfur (ISO 14596 or ISO 8754). Examples of Diluent Materials considered hydrocarbon based materials include: Feedstock HMFO (i.e. high sulfur HMFO); distillate based fuels such as road diesel, gas oil, MGO or MDO; cutter oil (which is used in formulating residual marine fuel oils); renewable oils and fuels such as biodiesel, methanol, ethanol; synthetic hydrocarbons and oils based on gas to liquids technology such as Fischer-Tropsch derived oils, synthetic oils such as those based on polyethylene, polypropylene, dimer, trimer and poly butylene; refinery residues or other hydrocarbon oils such as atmospheric residue, vacuum residue, fluid catalytic cracker (FCC) slurry oil, FCC cycle oil, pyrolysis gasoil, cracked light gas oil (CLGO), cracked heavy gas oil (CHGO), light cycle oil (LCO), heavy cycle oil (HCO), thermally cracked residue, coker heavy distillate, bitumen, de-asphalted heavy oil, visbreaker residue, slop oils, asphaltinic oils; used or recycled motor oils; lube oil aromatic extracts and crude oils such as heavy crude oil, distressed crude oils and similar materials that might otherwise be sent to a hydrocracker or diverted into the blending pool for a prior art high sulfur heavy (residual) marine fuel oil. Examples of Diluent Materials considered non-hydrocarbon based materials include: residual water (i.e. water absorbed from the humidity in the air or water that is miscible or solubilized, sometimes as microemulsions, into the hydrocarbons of the Product HMFO), fuel additives which can include, but are not limited to detergents, viscosity modifiers, pour point depressants, lubricity modifiers, de-hazers (e.g. alkoxylated phenol formaldehyde polymers), antifoaming agents (e.g. polyether modified polysiloxanes); ignition improvers; anti rust agents (e.g. succinic acid ester derivatives); corrosion inhibitors; anti-wear additives, anti-oxidants (e.g. phenolic compounds and derivatives), coating agents and surface modifiers, metal deactivators, static dissipating agents, ionic and nonionic surfactants, stabilizers, cosmetic colorants and odorants and mixtures of these. A third group of Diluent Materials may include suspended solids or fine particulate materials that are present because of the handling, storage and transport of the Product HMFO or the Heavy Marine Fuel Composition, including but not limited to: carbon or hydrocarbon solids (e.g. coke, graphitic solids, or micro-agglomerated asphaltenes), iron rust and other oxidative corrosion solids, fine bulk metal particles, paint or surface coating particles, plastic or polymeric or elastomer or rubber particles (e.g. resulting from the degradation of gaskets, valve parts, etc. . . . ), catalyst fines, ceramic or mineral particles, sand, clay, and other earthen particles, bacteria and other biologically generated solids, and mixtures of these that may be present as suspended particles, but otherwise don't detract from the merchantable quality of the Heavy Marine Fuel Composition as an ISO 8217 (2017) compliant heavy (residual) marine fuel.

The blend of Product HMFO and Diluent Materials must be of merchantable quality as a low sulfur heavy (residual) marine fuel. That is the blend must be suitable for the intended use as heavy marine bunker fuel and generally be fungible as a bunker fuel for ocean going ships. Preferably the Heavy Marine Fuel Composition must retain the bulk physical properties required of an ISO 8217 (2017) compliant residual marine fuel oil and a sulfur content lower than the global MARPOL standard of 0.5% wt. sulfur (ISO 14596 or ISO 8754) so that the material qualifies as MARPOL Annex VI Low Sulfur Heavy Marine Fuel Oil (LS-HMFO). The sulfur content of the Product HMFO can be lower than 0.5% wt. (i.e. below 0.1% wt sulfur (ISO 14596 or ISO 8754)) to qualify as a MARPOL Annex VI compliant Ultra-Low Sulfur Heavy Marine Fuel Oil (ULS-HMFO) and a Heavy Marine Fuel Composition likewise can be formulated to qualify as a MARPOL Annex VI compliant ULS-HMFO suitable for use as marine bunker fuel in the ECA zones. To qualify as an ISO 8217 (2017) qualified fuel, the Heavy Marine Fuel Composition of the present invention must meet those internationally accepted standards.

Production Plant Description:

Turning now to a more detailed illustrative embodiment of a production plant implementing both the core process and the DSRU disclosed, FIG. 4 show a schematic for a production plant implementing the core process described above combined with a pre-DSRU (FIG. 4, item 2) which will reduce Detrimental Solids in a Feedstock HMFO to produce a Product HMFO that is ISO 8217:2017 compliant and with the desired properties of a low Detrimental Solids content.

It will be appreciated by one of skill in the art that additional alternative embodiments for the core process and the DSRU may involve multiple vessels and reactors even though only one of each is shown. Variations using multiple vessels/reactors are contemplated by the present invention but are not illustrated in greater detail for simplicity sake.

The Reactor System (11) for the core process is described in greater detail below and using multiple vessels process has been described. It will be noted by one of skill in the art that in FIGS. 4 and 5, portions of the production plant with similar function and operation have been assigned the same reference number. This has been done for convenience and succinctness only and differences between FIG. 4 are duly noted and explained below.

The Feedstock HMFO (A) is fed from outside the battery limits (OSBL) to the Oil Feed Surge Drum (1) that receives feed from outside the battery limits (OSBL) and provides surge volume adequate to ensure smooth operation of the unit. Water entrained in the feed is removed from the HMFO with the water being discharged a stream (1c) for treatment OSBL.

Figure 4:
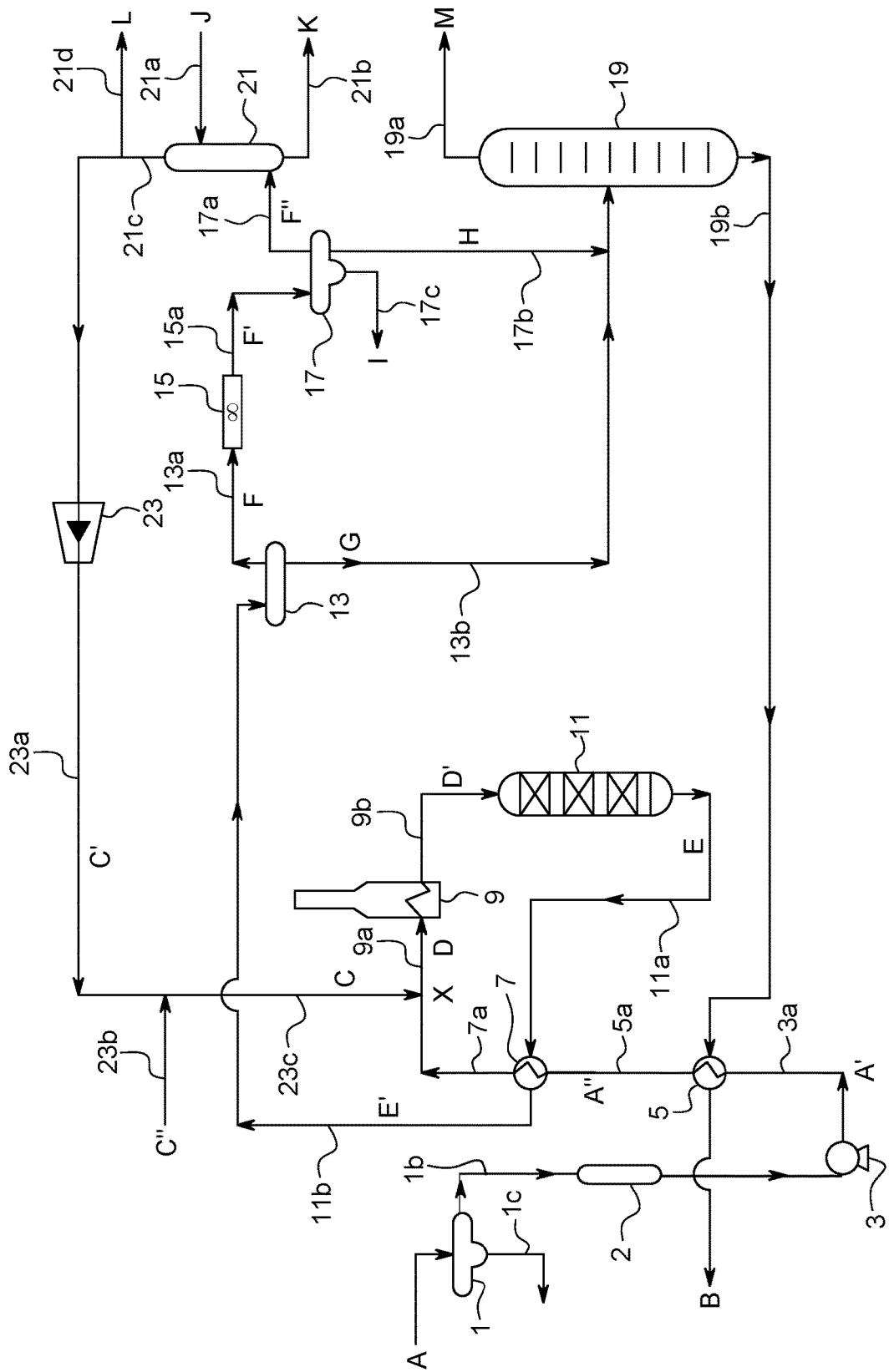
FIG. 4 is a basic schematic diagram of a plant to produce Product HMFO utilizing a combination of a Detrimental Solids removal unit to pre-treat the feedstock HMFO and a subsequent core process to produce Product HMFO.

As shown in FIG. 4, the Feedstock HMFO (A) is withdrawn from the Oil Feed Surge Drum (1) via line (1b) by the Oil Feed Pump (3) and sent to the DSRU (2) as a pretreatment step. The pre-treated Feedstock HMFO is pressurized to a pressure required for the process. The pressurized HMFO (A') then passes through line (3a) to the Oil Feed/Product Heat Exchanger (5) where the pressurized HMFO (A') is partially heated by the Product HMFO (B). The pressurized Feedstock HMFO (A') passing through line (5a) is further heated against the effluent from the Reactor System (E) in the Reactor Feed/Effluent Heat Exchanger (7).

The heated and pressurized Feedstock HMFO (A") in line (7a) is then mixed with Activating Gas (C) provided via line (23c) at Mixing Point (X) to form a Feedstock Mixture (D). The mixing point (X) can be any well know gas/liquid mixing system or entrainment mechanism well known to one skilled in the art.

The Feedstock Mixture (D) passes through line (9a) to the Reactor Feed Furnace (9) where the Feedstock Mixture (D) is heated to the specified process temperature. The Reactor Feed Furnace (9) may be a fired heater furnace or any other kind to type of heater as known to one of skill in the art if it will raise the temperature of the Feedstock mixture to the desired temperature for the process conditions.

The heated Feedstock Mixture (D') exits the Reactor Feed Furnace (9) via line 9b and is fed into the Reactor System (11). The heated Feedstock Mixture (D') enters the Reactor System (11) where environmental contaminates, such a sulfur, nitrogen, and metals are preferentially removed from the Feedstock HMFO component of the heated Feedstock Mixture. The Reactor System contains a catalyst which preferentially removes the sulfur compounds in the Feedstock HMFO component by reacting them with hydrogen in the Activating Gas to form hydrogen sulfide. The Reactor System will also achieve demetallization, denitrogenation, and a certain amount of ring opening hydrogenation of the complex aromatics and asphaltenes, however minimal hydrocracking of hydrocarbons should take place. The process conditions of hydrogen partial pressure, reaction pressure, temperature and residence time as measured by Liquid hourly velocity are optimized to achieve desired final product quality. A more detailed discussion of the Reactor System, the catalyst, the process conditions, and other aspects of the process are contained below in the "Reactor System Description."

The Reactor System Effluent (E) exits the Reactor System (11) via line (11a) and exchanges heat against the pressurized and partially heats the Feedstock HMFO (A') in the Reactor Feed/Effluent Exchanger (7). The partially cooled Reactor System Effluent (E') then flows via line (11c) to the Hot Separator (13).

The Hot Separator (13) separates the gaseous components of the Reactor System Effluent (F) which are directed to line (13a) from the liquid components of the Reactor System effluent (G) which are directed to line (13b). The gaseous components of the Reactor System effluent in line (13a) are cooled against air in the Hot Separator Vapor Air Cooler (15) and then flow via line (15a) to the Cold Separator (17).

The Cold Separator (17) further separates any remaining gaseous components from the liquid components in the cooled gaseous components of the Reactor System Effluent (F'). The gaseous components from the Cold Separator (F") are directed to line (17a) and fed onto the Amine Absorber (21). The Cold Separator (17) also separates any remaining Cold Separator hydrocarbon liquids (H) in line (17b) from any Cold Separator condensed liquid water (I). The Cold Separator condensed liquid water (I) is sent OSBL via line (17c) for treatment.

The hydrocarbon liquid components of the Reactor System effluent from the Hot Separator (G) in line (13b) and the Cold Separator hydrocarbon liquids (H) in line (17b) are combined and are fed to the Oil Product Stripper System (19). The Oil Product Stripper System (19) removes any residual hydrogen and hydrogen sulfide from the Product HMFO (B) which is discharged in line (19b) to storage OSBL. It is also contemplated that a second draw (not shown) may be included to withdraw a distillate product, preferably a middle to heavy distillate. The vent stream (M) from the Oil Product Stripper in line (19a) may be sent to the fuel gas system or to the flare system that are OSBL.

Figure 5:
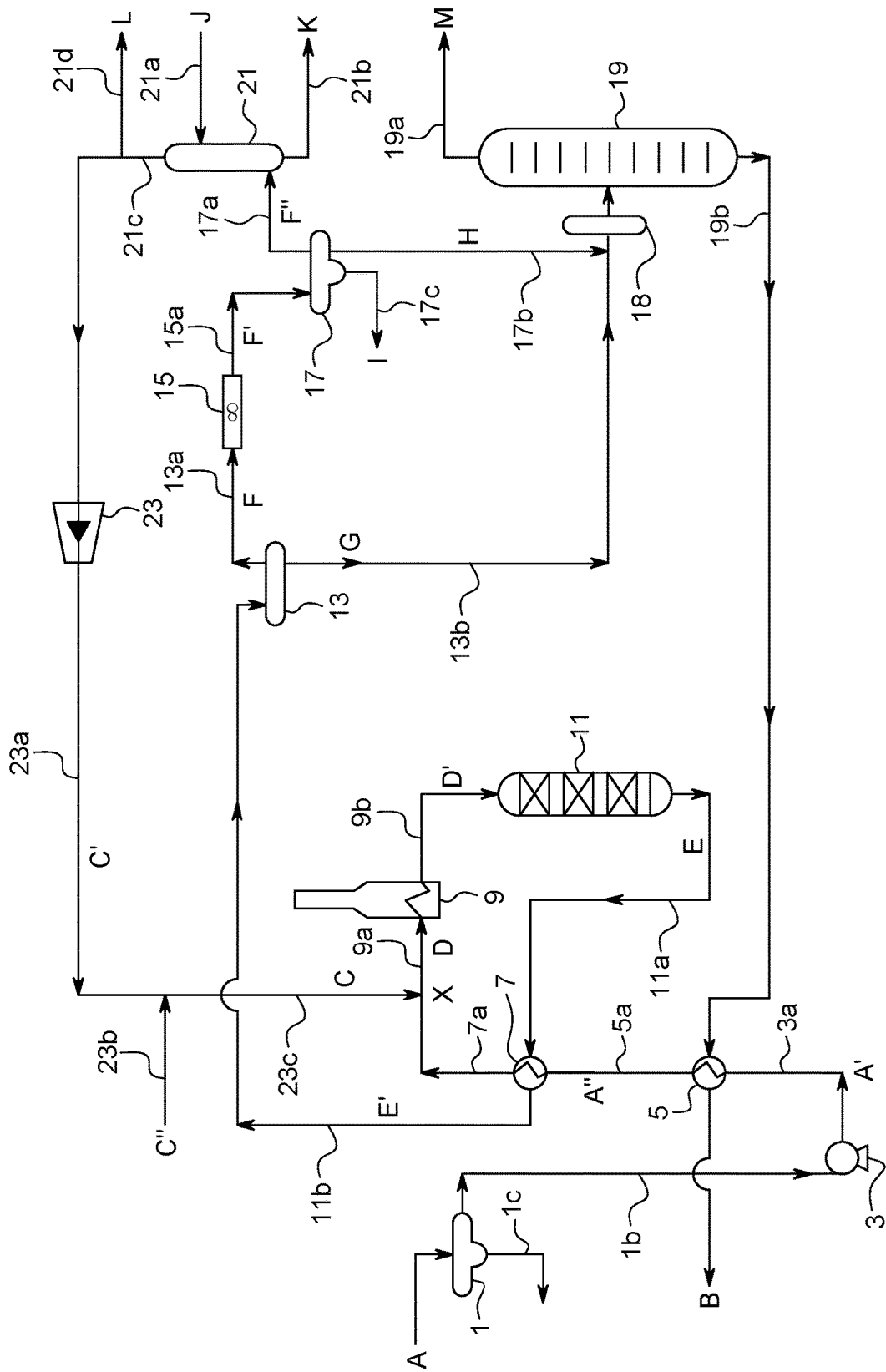
FIG. 5 is a basic schematic diagram of a plant to produce Product HMFO utilizing a combination of a Core Process and a subsequent Detrimental Solids Removal Unit to produce Product HMFO.

An alternative embodiment not shown in FIG. 5, but well within the skill of one in the art, would be to relocate the DSRU (18) from the line prior to the Oil Product Stripper (19) to a location downstream of the Oil Product Stripper (19). Such a relocation of the DSRU (18) to line (19b) will allow for the Detrimental Solids removal from the final product HMFO prior to being sent to storage OSBL. This location is practicable because the DSRU enhances the value of the Product HMFO without adversely impacting the desirable properties of the Product HMFO. The DRSU may also impart an additional amount of stability to the Product HMFO by removing the micron sized solids that may promote the formation of asphaltene solids or paraffinic solids.

The gaseous components from the Cold Separator (F") in line (17a) contain a mixture of hydrogen, hydrogen sulfide and light hydrocarbons (mostly methane and ethane). This vapor stream (17a) feeds an Amine Absorber (21) where it is contacted against Lean Amine (J) provided OSBL via line (21a) to the Amine Absorber (21) to remove hydrogen sulfide from the gases making up the Activating Gas recycle stream (C'). Rich amine (K) which has absorbed hydrogen sulfide exits the bottom of the Amine Absorber (21) and is sent OSBL via line (21b) for amine regeneration and sulfur recovery.

The Amine Absorber overhead vapor in line (21c) is preferably recycled to the process as a Recycle Activating Gas (C') via the Recycle Compressor (23) and line (23 a) where it is mixed with the Makeup Activating Gas (C") provided OSBL by line (23b). This mixture of Recycle Activating Gas (C') and Makeup Activating Gas (C") to form the Activating Gas (C) utilized in the process via line (23c) as noted above. A Scrubbed Purge Gas stream (H) is taken from the Amine Absorber overhead vapor line (21c) and sent via line (21d) to OSBL to prevent the buildup of light hydrocarbons or other non-condensables.

Reactor System Description:

The core process Reactor System (11) illustrated in FIG. 4 comprises a single reactor vessel loaded with the process catalyst and sufficient controls, valves and sensors as one of skill in the art would readily appreciate.

Alternative Reactor Systems in which more than one reactor vessel may be utilized in parallel or in a cascading series can easily be substituted for the single reactor vessel Reactor System 11 shown. In such an embodiment, each reactor vessel is similarly loaded with process catalyst and can be provided the heated Feed Mixture (D') via a common line. The effluent from each of the three reactors is recombined in line and forms a combined Reactor Effluent (E) for further processing as described above. The illustrated arrangement will allow the three reactors to carry out the process effectively multiplying the hydraulic capacity of the overall Reactor System. Control valves and isolation valves may also prevent feed from entering one reactor vessel but not another reactor vessel. In this way one reactor can be by-passed and placed off-line for maintenance and reloading of catalyst while the remaining reactors continues to receive heated Feedstock Mixture (D'). It will be appreciated by one of skill in the art this arrangement of reactor vessels in parallel is not limited in number to three, but multiple additional reactor vessels can be added. The only limitation to the number of parallel reactor vessels is plot spacing and the ability to provide heated Feedstock Mixture (D') to each active reactor.

In another illustrative embodiment cascading reactor vessels are loaded with process catalyst with the same or different activities toward metals, sulfur or other environmental contaminates to be removed. For example, one reactor may be loaded with a highly active demetallization catalyst, a second subsequent or downstream reactor may be loaded with a balanced demetallization/desulfurizing catalyst, and reactor downstream from the second reactor may be loaded with a highly active desulfurization catalyst. This allows for greater control and balance in process conditions (temperature, pressure, space flow velocity, etc. . . . ) so it is tailored for each catalyst. In this way one can optimize the parameters in each reactor depending upon the material being fed to that specific reactor/catalyst combination and minimize the hydrocracking reactions. As with the prior illustrative embodiment, multiple cascading series of reactors can be utilized in parallel and in this way the benefits of such an arrangement noted above (i.e. allow one series to be "online" while the other series is "off line" for maintenance or allow increased plant capacity).

The reactor(s) that form the Reactor System may be fixed bed, ebulliated bed or slurry bed or a combination. As envisioned, fixed bed reactors are preferred as these are easier to operate and maintain.

The reactor vessel in the Reactor System is loaded with one or more process catalysts. The exact design of the process catalyst system is a function of feedstock properties, product requirements and operating constraints and optimization of the process catalyst can be carried out by routine trial and error by one of ordinary skill in the art.

The process catalyst(s) comprise at least one metal selected from the group consisting of the metals each belonging to the groups 6, 8, 9 and 10 of the Periodic Table, and more preferably a mixed transition metal catalyst such as Ni—Mo, Co—Mo, Ni—W or Ni—Co—Mo are utilized. The metal is preferably supported on a porous inorganic oxide catalyst carrier. The porous inorganic oxide catalyst carrier is at least one carrier selected from the group consisting of alumina, alumina/boria carrier, a carrier containing metal-containing aluminosilicate, alumina/phosphorus carrier, alumina/alkaline earth metal compound carrier, alumina/titania carrier and alumina/zirconia carrier. The preferred porous inorganic oxide catalyst carrier is alumina. The pore size and metal loadings on the carrier may be systematically varied and tested with the desired feedstock and process conditions to optimize the properties of the Product HMFO. Such activities are well known and routine to one of skill in the art. Catalyst in the fixed bed reactor(s) may be dense-loaded or sock-loaded.

The catalyst selection utilized within and for loading the Reactor System may be preferential to desulfurization by designing a catalyst loading scheme that results in the Feedstock mixture first contacting a catalyst bed that with a catalyst preferential to demetallization followed downstream by a bed of catalyst with mixed activity for demetallization and desulfurization followed downstream by a catalyst bed with high desulfurization activity. In effect the first bed with high demetallization activity acts as a guard bed for the desulfurization bed.

The objective of the Reactor System is to treat the Feedstock HMFO at the severity required to meet the Product HMFO specification. Demetallization, denitrogenation and hydrocarbon hydrogenation reactions may also occur to some extent when the process conditions are optimized so performing the Reactor System achieves the required level of desulfurization. Hydrocracking is preferably minimized to reduce the volume of hydrocarbons formed as by-product hydrocarbons to the process. The objective of the process is to selectively remove the environmental contaminates from Feedstock HMFO and minimize the formation of unnecessary by-product hydrocarbons (C1-C8 hydrocarbons).

The process reactive conditions in each reactor vessel will depend upon the feedstock, the catalyst utilized and the desired final properties of the Product HMFO desired. Variations in reactive conditions are to be expected by one of ordinary skill in the art and these may be determined by pilot plant testing and systematic optimization of the process. With this in mind it has been found that the operating pressure, the indicated operating temperature, the ratio of the Activating Gas to Feedstock HMFO, the partial pressure of hydrogen in the Activating Gas and the space velocity all are important parameters to consider. The operating pressure of the Reactor System should be in the range of 250 psig and 3000 psig, preferably between 1000 psig and 2500 psig and more preferably between 1500 psig and 2200 psig. The indicated operating temperature of the Reactor System should be 500° F. to 900° F., preferably between 650° F. and 850° F. and more preferably between 680° F. and 800° F. The ratio of the quantity of the Activating Gas to the quantity of Feedstock HMFO should be in the range of 250 scf gas/bbl of Feedstock HMFO to 10,000 scf gas/bbl of Feedstock HMFO, preferably between 2000 scf gas/bbl of Feedstock HMFO to 5000 scf gas/bbl of Feedstock HMFO and more preferably between 2500 scf gas/bbl of Feedstock HMFO to 4500 scf gas/bbl of Feedstock HMFO. The Activating Gas should be selected from mixtures of nitrogen, hydrogen, carbon dioxide, gaseous water, and methane, so Activating Gas has an ideal gas partial pressure of hydrogen ($p_{H2}$) greater than 80% of the total pressure of the Activating Gas mixture (P) and preferably wherein the Activating Gas has an ideal gas partial pressure of hydrogen ($p_{H2}$) greater than 95% of the total pressure of the Activating Gas mixture (P). The Activating Gas may have a hydrogen mole fraction in the range between 80% of the total moles of Activating Gas mixture and more preferably wherein the Activating Gas has a hydrogen mole fraction between 80% and 99% of the total moles of Activating Gas mixture. The liquid hourly space velocity within the Reactor System should be between 0.05 oil/hour/m$^3$ catalyst and 1.0 oil/hour/m$^3$ catalyst; preferably between 0.08 oil/hour/m$^3$ catalyst and 0.5 oil/hour/m$^3$ catalyst and more preferably between 0.1 oil/hour/m$^3$ catalyst and 0.3 oil/hour/m$^3$ catalyst to achieve deep desulfurization with product sulfur levels below 0.1 ppmw.

The hydraulic capacity rate of the Reactor System should be between 100 bbl of Feedstock HMFO/day and 100,000 bbl of Feedstock HMFO/day, preferably between 1000 bbl of Feedstock HMFO/day and 60,000 bbl of Feedstock HMFO/day, more preferably between 5,000 bbl of Feedstock HMFO/day and 45,000 bbl of Feedstock HMFO/day, and even more preferably between 10,000 bbl of Feedstock HMFO/day and 30,000 bbl of Feedstock HMFO/day. The desired hydraulic capacity may be achieved in a single reactor vessel Reactor System or in a multiple reactor vessel Reactor System.

These examples will provide one skilled in the art with a more specific illustrative embodiment for conducting the process disclosed and claimed herein:

Example 1

Overview:

The purpose of a pilot test run is to demonstrate that feedstock HMFO can be processed through a reactor loaded with commercially available catalysts at specified conditions to remove environmental contaminates, specifically sulfur and other contaminants from the HMFO to produce a product HMFO that is MARPOL compliant, that is production of a Low Sulfur Heavy Marine Fuel Oil (LS-HMFO) or Ultra-Low Sulfur Heavy Marine Fuel Oil (USL-HMFO).

Pilot Unit Set Up:

The pilot unit will be set up with two 434 cm$^3$ reactors arranged in series to process the feedstock HMFO. The lead reactor will be loaded with a blend of a commercially available hydro-demetaling (HDM) catalyst and a commercially available hydro-transition (HDT) catalyst. One of skill in the art will appreciate that the HDT catalyst layer may be formed and optimized using a mixture of HDM and HDS catalysts combined with an inert material to achieve the desired intermediate/transition activity levels. The second reactor will be loaded with a blend of the commercially available hydro-transition (HDT) and a commercially available hydrodesulfurization (HDS). One can load the second reactor simply with a commercially hydrodesulfurization (HDS) catalyst. One of skill in the art will appreciate that the specific feed properties of the Feedstock HMFO may affect the proportion of HDM, HDT and HDS catalysts in the reactor system. A systematic process of testing different combinations with the same feed will yield the optimized catalyst combination for any feedstock and reaction conditions. For this example, the first reactor will be loaded with ⅔ hydro-demetaling catalyst and ⅓ hydro-transition catalyst. The second reactor will be loaded with all hydrodesulfurization catalyst. The catalysts in each reactor will be mixed with glass beads (approximately 50% by volume) to improve liquid distribution and better control reactor temperature. For this pilot test run, one should use these commercially available catalysts: HDM: Albemarle KFR 20 series or equivalent; HDT: Albemarle KFR 30 series or equivalent; HDS: Albemarle KFR 50 or KFR 70 or equivalent. Once set up of the pilot unit is complete, the catalyst can be activated by sulfiding the catalyst using dimethyldisulfide (DMDS) in a manner well known to one of skill in the art.

Pilot Unit Operation:

Upon completion of the activating step, the pilot unit will be ready to receive the feedstock HMFO and Activating Gas feed. For the present example, the Activating Gas can be technical grade or better hydrogen gas. The mixed Feedstock HMFO and Activating Gas will be provided to the pilot plant at rates and operating conditions as specified: Oil Feed Rate: 108.5 ml/h (space velocity=0.25/h); Hydrogen/Oil Ratio: 570 Nm3/m3 (3200 scf/bbl); Reactor Temperature: 372° C. (702° F.); Reactor Outlet Pressure:13.8 MPa(g) (2000 psig).

One of skill in the art will know that the rates and conditions may be systematically adjusted and optimized depending upon feed properties to achieve the desired product requirements. The unit will be brought to a steady state for each condition and full samples taken so analytical tests can be completed. Material balance for each condition should be closed before moving to the next condition.

Expected impacts on the Feedstock HMFO properties are: Sulfur Content (wt %): Reduced by at least 80%; Metals Content (wt %): Reduced by at least 80%; MCR/Asphaltene Content (wt %): Reduced by at least 30%; Nitrogen Content (wt %): Reduced by at least 20%; C1-Naphtha Yield (wt %): Not over 3.0% and preferably not over 1.0%. 078. Process conditions in the Pilot Unit can be systematically adjusted as per Table 4 to assess the impact of process conditions and optimize the performance of the process for the specific catalyst and feedstock HMFO utilized.

TABLE 4

Optimization of Process Conditions

| Case | HC Feed Rate (ml/h), [LHSV(/h)] | Nm$^3$ H$_2$/m$^3$ oil/ scf H$_2$/bbl oil | Temp (° C./° F.) | Pressure (MPa (g)/psig) |
|---|---|---|---|---|
| Baseline | 108.5 [0.25] | 570/3200 | 372/702 | 13.8/2000 |
| T1 | 108.5 [0.25] | 570/3200 | 362/684 | 13.8/2000 |
| T2 | 108.5 [0.25] | 570/3200 | 382/720 | 13.8/2000 |

TABLE 4-continued

Optimization of Process Conditions

| Case | HC Feed Rate (ml/h), [LHSV(/h)] | Nm³ H₂/m³ oil/ scf H₂/bbl oil | Temp (° C./° F.) | Pressure (MPa (g)/psig) |
|---|---|---|---|---|
| L1 | 130.2 [0.30] | 570/3200 | 372/702 | 13.8/2000 |
| L2 | 86.8 [0.20] | 570/3200 | 372/702 | 13.8/2000 |
| H1 | 108.5 [0.25] | 500/2810 | 372/702 | 13.8/2000 |
| H2 | 108.5 [0.25] | 640/3590 | 372/702 | 13.8/2000 |
| S1 | 65.1 [0.15] | 620/3480 | 385/725 | 15.2/2200 |

In this way, the conditions of the pilot unit can be optimized to achieve less than 0.5% wt. sulfur product HMFO and preferably a 0.1% wt. sulfur product HMFO. Conditions for producing ULS-HMFO (i.e. 0.1% wt. sulfur product HMFO) will be: Feedstock HMFO Feed Rate: 65.1 ml/h (space velocity=0.15/h); Hydrogen/Oil Ratio: 620 Nm³/m³ (3480 scf/bbl); Reactor Temperature: 385° C. (725° F.); Reactor Outlet Pressure: 15 MPa(g) (2200 psig)

Table 5 summarizes the anticipated impacts on key properties of HMFO.

TABLE 5

Expected Impact of Process on Key Properties of HMFO

| Property | Minimum | Typical | Maximum |
|---|---|---|---|
| Sulfur Conversion/Removal | 80% | 90% | 98% |
| Metals Conversion/Removal | 80% | 90% | 100% |
| MCR Reduction | 30% | 50% | 70% |
| Asphaltene Reduction | 30% | 50% | 70% |
| Nitrogen Conversion | 10% | 30% | 70% |
| C1 through Naphtha Yield | 0.5% | 1.0% | 4.0% |
| Hydrogen Consumption (scf/bbl) | 500 | 750 | 1500 |

Table 6 lists analytical tests to be carried out for the characterization of the Feedstock HMFO and Product HMFO. The analytical tests include those required by ISO for the Feedstock HMFO and the product HMFO to qualify and trade in commerce as ISO compliant residual marine fuels. The additional parameters are provided so that one skilled in the art can understand and appreciate the effectiveness of the inventive process.

TABLE 6

Analytical Tests and Testing Procedures

| | |
|---|---|
| Sulfur Content | ISO 8754 or ISO 14596 or ASTM D4294 |
| Density @ 15° C. | ISO 3675 or ISO 12185 |
| Kinematic Viscosity @ 50° C. | ISO 3104 |
| Pour Point, ° C. | ISO 3016 |
| Flash Point, ° C. | ISO 2719 |
| CCAI | ISO 8217, ANNEX B |
| Ash Content | ISO 6245 |
| Total Sediment - Aged | ISO 10307-2 |
| Micro Carbon Residue, mass % | ISO 10370 |
| H2S, mg/kg | IP 570 |
| Acid Number | ASTM D664 |
| Water | ISO 3733 |
| Specific Contaminants | IP 501 or IP 470 (unless indicated otherwise) |
| Vanadium | |
| Sodium | or ISO 14597 |
| Aluminum | or ISO 10478 |
| Silicon | or ISO 10478 |
| Calcium | or IP 500 |
| Zinc | or IP 500 |
| Phosphorous | IP 500 |
| Nickle | |
| Iron | |

TABLE 6-continued

Analytical Tests and Testing Procedures

| | |
|---|---|
| Distillation | ASTM D7169 |
| C:H Ratio | ASTM D3178 |
| SARA Analysis | ASTM D2007 |
| Asphaltenes, wt % | ASTM D6560 |
| Total Nitrogen | ASTM D5762 |
| Vent Gas Component Analysis | FID Gas Chromatography or comparable |

Table 7 contains the Feedstock HMFO analytical test results and the Product HMFO analytical test results expected from the inventive process that indicate the production of a LS HMFO. It will be noted by one of skill in the art that under the conditions, the levels of hydrocarbon cracking will be minimized to levels substantially lower than 10%, more preferably less than 5% and even more preferably less than 1% of the total mass balance.

TABLE 7

Analytical Results

| | Feedstock HMFO | Product HMFO |
|---|---|---|
| Sulfur Content, mass % | 3.0 | 0.3 |
| Density @ 15 C., kg/m³ | 990 | 950[1] |
| Kinematic Viscosity @ 50 C., mm²/s | 380 | 100[1] |
| Pour Point, ° C. | 20 | 10 |
| Flash Point, ° C. | 110 | 100[1] |
| CCAI | 850 | 820 |
| Ash Content, mass % | 0.1 | 0.0 |
| Total Sediment - Aged, mass % | 0.1 | 0.0 |
| Micro Carbon Residue, mass % | 13.0 | 6.5 |
| H2S, mg/kg | 0 | 0 |
| Acid Number, mg KO/g | 1 | 0.5 |
| Water, vol % | 0.5 | 0 |
| Specific Contaminants, mg/kg | | |
| Vanadium | 180 | 20 |
| Sodium | 30 | 1 |
| Aluminum | 10 | 1 |
| Silicon | 30 | 3 |
| Calcium | 15 | 1 |
| Zinc | 7 | 1 |
| Phosphorous | 2 | 0 |
| Nickle | 40 | 5 |
| Iron | 20 | 2 |
| Distillation, ° C./° F. | | |
| IBP | 160/320 | 120/248 |
| 5% wt | 235/455 | 225/437 |
| 10% wt | 290/554 | 270/518 |
| 30% wt | 410/770 | 370/698 |
| 50% wt | 540/1004 | 470/878 |
| 70% wt | 650/1202 | 580/1076 |
| 90% wt | 735/1355 | 660/1220 |
| FBP | 820/1508 | 730/1346 |
| C:H Ratio (ASTM D3178) | 1.2 | 1.3 |
| SARA Analysis | | |
| Saturates | 16 | 22 |
| Aromatics | 50 | 50 |
| Resins | 28 | 25 |
| Asphaltenes | 6 | 3 |
| Asphaltenes, wt % | 6.0 | 2.5 |
| Total Nitrogen, mg/kg | 4000 | 3000 |

Note:
[1]property will be adjusted to a higher value by post process removal of light material via distillation or stripping from product HMFO.

The product HMFO produced by the inventive process will reach ULS HMFO limits (i.e. 0.1% wt. sulfur product HMFO) by systematic variation of the process parameters, for example by a lower space velocity or by using a Feedstock HMFO with a lower initial sulfur content.

Example 2: RMG-380 HMFO

Pilot Unit Set Up:

A pilot unit was set up as noted above in Example 1 with these changes: the first reactor was loaded with: as the first (upper) layer encountered by the feedstock 70% vol Albemarle KFR 20 series hydro-demetaling catalyst and 30% vol Albemarle KFR 30 series hydro-transition catalyst as the second (lower) layer. The second reactor was loaded with 20% Albemarle KFR 30 series hydrotransition catalyst as the first (upper) layer and 80% vol hydrodesulfurization catalyst as the second (lower) layer. The catalyst was activated by sulfiding the catalyst with dimethyldisulfide (DMDS) in a manner well known to one of skill in the art.

Pilot Unit Operation:

Upon completion of the activating step, the pilot unit was ready to receive the feedstock HMFO and Activating Gas feed. The Activating Gas was technical grade or better hydrogen gas. The Feedstock HMFO was a commercially available and merchantable ISO 8217 (2017) compliant HMFO, except for a high sulfur content (2.9 wt %). The mixed Feedstock HMFO and Activating Gas was provided to the pilot plant at rates and conditions as specified in Table 8 below. The conditions were varied to optimize the level of sulfur in the product HMFO material.

TABLE 8

Process Conditions

| Case | HC Feed Rate (ml/h), [LHSV(/h)] | $Nm^3\ H_2/m^3$ oil/ scf $H_2$/bbl oil | Temp (° C./° F.) | Pressure (MPa (g)/ psig) | Product HMFO Sulfur % wt. |
|---|---|---|---|---|---|
| Baseline | 108.5 [0.25] | 570/3200 | 371/700 | 13.8/2000 | 0.24 |
| T1 | 108.5 [0.25] | 570/3200 | 362/684 | 13.8/2000 | 0.53 |
| T2 | 108.5 [0.25] | 570/3200 | 382/720 | 13.8/2000 | 0.15 |
| L1 | 130.2 [0.30] | 570/3200 | 372/702 | 13.8/2000 | 0.53 |
| S1 | 65.1 [0.15] | 620/3480 | 385/725 | 15.2/2200 | 0.10 |
| P1 | 108.5 [0.25] | 570/3200 | 371/700 | /1700 | 0.56 |
| T2/P1 | 108.5 [0.25] | 570/3200 | 382/720 | /1700 | 0.46 |

Analytical data for a representative sample of the feedstock HMFO and representative samples of product HMFO are below:

TABLE 7

Analytical Results - HMFO (RMG-380)

| | Feedstock | Product | Product |
|---|---|---|---|
| Sulfur Content, mass % | 2.9 | 0.3 | 0.1 |
| Density @ 15° C., kg/m$^3$ | 988 | 932 | 927 |
| Kinematic Viscosity @ 50° C., mm$^2$/s | 382 | 74 | 47 |
| Pour Point, ° C. | −3 | −12 | −30 |
| Flash Point, ° C. | 116 | 96 | 90 |
| CCAI | 850 | 812 | 814 |
| Ash Content, mass % | 0.05 | 0.0 | 0.0 |
| Total Sediment - Aged, mass % | 0.04 | 0.0 | 0.0 |
| Micro Carbon Residue, mass % | 11.5 | 3.3 | 4.1 |
| H2S, mg/kg | 0.6 | 0 | 0 |
| Acid Number, mg KO/g | 0.3 | 0.1 | >0.05 |
| Water, vol % | 0 | 0.0 | 0.0 |
| Specific Contaminants, mg/kg | | | |
| Vanadium | 138 | 15 | <1 |
| Sodium | 25 | 5 | 2 |
| Aluminum | 21 | 2 | <1 |
| Silicon | 16 | 3 | 1 |
| Calcium | 6 | 2 | <1 |
| Zinc | 5 | <1 | <1 |
| Phosphorous | <1 | 2 | 1 |
| Nickle | 33 | 23 | 2 |
| Iron | 24 | 8 | 1 |
| Distillation, ° C./° F. | | | |
| IBP | 178/352 | 168/334 | 161/322 |
| 5% wt | 258/496 | 235/455 | 230/446 |
| 10% wt | 298/569 | 270/518 | 264/507 |
| 30% wt | 395/743 | 360/680 | 351/664 |
| 50% wt | 517/962 | 461/862 | 439/822 |
| 70% wt | 633/1172 | 572/1062 | 552/1026 |
| 90% wt | >720/>1328 | 694/1281 | 679/1254 |
| FBP | >720/>1328 | >720/>1328 | >720/>1328 |
| C:H Ratio (ASTM D3178) | 1.2 | 1.3 | 1.3 |
| SARA Analysis | | | |
| Saturates | 25.2 | 28.4 | 29.4 |
| Aromatics | 50.2 | 61.0 | 62.7 |
| Resins | 18.6 | 6.0 | 5.8 |
| Asphaltenes | 6.0 | 4.6 | 2.1 |
| Asphaltenes, wt % | 6.0 | 4.6 | 2.1 |
| Total Nitrogen, mg/kg | 3300 | 1700 | 1600 |

In Table 7, both feedstock HMFO and product HMFO exhibited observed bulk properties consistent with ISO 8217 (2017) for a merchantable residual marine fuel oil, except that the sulfur content of the product HMFO was reduced as noted above when compared to the feedstock HMFO.

One of skill in the art will appreciate that the above product HMFO produced by the inventive process has achieved not only an ISO 8217 (2017) compliant LS HMFO (i.e. 0.5% wt. sulfur) but also an ISO 8217 (2017) compliant ULS HMFO limits (i.e. 0.1% wt. sulfur) product HMFO.

Example 3: RMK-500 HMFO

The feedstock to the pilot reactor utilized in example 2 above was changed to a commercially available and merchantable ISO 8217 (2017) RMK-500 compliant HMFO, except that it has high environmental contaminates (i.e. sulfur (3.3 wt %)). Other bulk characteristic of the RMK-500 feedstock high sulfur HMFO are provide below:

TABLE 8

| Analytical Results- Feedstock HMFO (RMK-500) | |
|---|---|
| Sulfur Content, mass % | 3.3 |
| Density @ 15° C., kg/m$^3$ | 1006 |
| Kinematic Viscosity @ 50° C., mm$^2$/s | 500 |

The mixed Feedstock (RMK-500) HMFO and Activating Gas was provided to the pilot plant at rates and conditions and the resulting sulfur levels achieved in the table below

TABLE 9

| Process Conditions | | | | | |
|---|---|---|---|---|---|
| Case | HC Feed Rate (ml/h), [LHSV(/h)] | Nm$^3$ H$_2$/m$^3$ oil/ scf H$_2$/bbl oil | Temp (° C./° F.) | Pressure (MPa(g)/psig) | Product (RMK-500) sulfur % wt. |
| A | 108.5 [0.25] | 640/3600 | 377/710 | 13.8/2000 | 0.57 |
| B | 95.5 [0.22] | 640/3600 | 390/735 | 13.8/2000 | 0.41 |
| C | 95.5 [0.22] | 640/3600 | 390/735 | 11.7/1700 | 0.44 |
| D | 95.5 [0.22] | 640/3600 | 393/740 | 10.3/1500 | 0.61 |
| E | 95.5 [0.22] | 640/3600 | 393/740 | 17.2/2500 | 0.37 |
| F | 95.5 [0.22] | 640/3600 | 393/740 | 8.3/1200 | 0.70 |
| G | 95.5 [0.22] | 640/3600 | 416/780 | 8.3/1200 | |

The resulting product (RMK-500) HMFO exhibited observed bulk properties consistent with the feedstock (RMK-500) HMFO, except that the sulfur content was reduced as noted in the above table.

One of skill in the art will appreciate that the above product HMFO produced by the inventive process has achieved a LS HMFO (i.e. 0.5% wt. sulfur) product HMFO having bulk characteristics of a ISO 8217 (2017) compliant RMK-500 residual fuel oil. It will also be appreciated that the process can be successfully carried out under non-hydrocracking conditions (i.e. lower temperature and pressure) that substantially reduce the hydrocracking of the feedstock material. When conditions were increased to much higher pressure (Example E) a product with a lower sulfur content was achieved, however some observed that there was an increase in light hydrocarbons and wild naphtha production.

This prophetic example will provide one skilled in the art with a more specific illustrative embodiment for conducting the processes disclosed:

Prophetic Example of DSRU Operation:

To exemplify the invention, experiments can be carried out using a first porous sintered metal filter having a permeametric radii from 50-100 micron followed by a second porous sintered metal filter having a permeametric radii from 50-0.1 micron. Examples of such filter materials are commercially available in stainless steel and other alloy metals from Mott Corp and other suppliers. Suitable membrane filters may also be useful. A physical entrainment filter composed of a packed bed of particulate material such a deactivated alumina, silica and the like will also likely achieve the desired results. The removal of the Detrimental Solids is carried out by the physical entrainment or removal of the solids from the HMFO stream.

As part of the post Core Process treatment of the Product HMFO, the described process can be carried out to condition the Product HMFO for easier transport and handling, increased compatibility and stability when blended with other marine fuel materials (i.e. MGO or MDO), and enhance the value of these materials as low sulfur HMFO.

Table 4 contains the expected analytical test results for (A) Feedstock HMFO; (B) the Core Process Product HMFO and (C) Overall Process (Core+DSRU) from the inventive processes. These results will indicate to one of skill in the art that the production of a ULS HMFO can be achieved. It will be noted by one of skill in the art that under the conditions, the levels of hydrocarbon cracking will be minimized to levels substantially lower than 10%, more preferably less than 5% and even more preferably less than 1% of the total mass balance.

TABLE 4

| Analytical Results | | | |
|---|---|---|---|
| | A | B | C |
| Sulfur Content, mass % | 3.0 | Less than 0.5 | Less than 0.1 |
| Density @ 15° C., kg/m$^3$ | 990 | 950[(1)] | 950[(1)] |
| Kinematic Viscosity @ 50° C., mm$^2$/s | 380 | 100[(1)] | 100[(1)] |
| Pour Point, ° C. | 20 | 10 | 10 |
| Flash Point, ° C. | 110 | 100[(1)] | 100[(1)] |
| CCAI | 850 | 820 | 820 |
| Ash Content, mass % | 0.1 | 0.0 | 0.0 |
| Total Sediment - Aged, mass % | 0.1 | 0.0 | 0.0 |
| Micro Carbon Residue, mass % | 13.0 | 6.5 | 6.5 |
| H2S, mg/kg | 0 | 0 | 0 |
| Acid Number, mg KO/g | 1 | 0.5 | Less than 0.5 |
| Water, vol % | 0.5 | 0 | 0 |
| Specific Contaminants, mg/kg | | | |
| Vanadium | 180 | 20 | 20 |
| Sodium | 30 | 1 | 1 |

TABLE 4-continued

Analytical Results

|  | A | B | C |
|---|---|---|---|
| Aluminum | 10 | 1 | 1 |
| Silicon | 30 | 3 | 3 |
| Calcium | 15 | 1 | 1 |
| Zinc | 7 | 1 | 1 |
| Phosphorous | 2 | 0 | 0 |
| Nickle | 40 | 5 | 5 |
| Iron | 20 | 2 | 2 |
| Distillation, ° C./° F. | | | |
| IBP | 160/320 | 120/248 | 120/248 |
| 5% wt | 235/455 | 225/437 | 225/437 |
| 10% wt | 290/554 | 270/518 | 270/518 |
| 30% wt | 410/770 | 370/698 | 370/698 |
| 50% wt | 540/1004 | 470/878 | 470/878 |
| 70% wt | 650/1202 | 580/1076 | 580/1076 |
| 90% wt | 735/1355 | 660/1220 | 660/1220 |
| FBP | 820/1508 | 730/1346 | 730/1346 |
| C:H Ratio (ASTM D3178) | 1.2 | 1.3 | 1.3 |
| SARA Analysis | | | |
| Saturates | 16 | 22 | 22 |
| Aromatics | 50 | 50 | 50 |
| Resins | 28 | 25 | 25 |
| Asphaltenes | 6 | 3 | 3 |
| Asphaltenes, wt % | 6.0 | 2.5 | 2.5 |
| Total Nitrogen, mg/kg | 4000 | 3000 | 3000 |

Note:
(1)property will be adjusted to a higher value by post process removal of light material via distillation or stripping from product HMFO.

One of skill in the art will know that the Aluminum and Silicon contaminates are directly correlated to the cat fines and other mineral solids present in the Feedstock HMFO. The primary source of these solids is the inclusion of FCC slurry oil as a component of the Feedstock HMFO, although other sources may also contribute to these contaminations. The low levels of Aluminum and Silicon are achieved in the Product HMFO and one of skill in the art will appreciate this indicates a significant reduction in the cat fines and other Detrimental Solids present in the Product HMFO. Further solids removal will be achieved with the post processing DSRU and it is expected that solids with a diameter in the range of 0.1 to 100 microns will be removed by the DSRU from the Product HMFO.

It will be appreciated by those skilled in the art that changes could be made to the illustrative embodiments described above without departing from the broad inventive concepts thereof. It is understood, therefore, that the inventive concepts disclosed are not limited to the illustrative embodiments or examples disclosed, but it is intended to cover modifications within the scope of the inventive concepts as defined by the claims.

The invention claimed is:

1. A process for reducing the Environmental Contaminants and Detrimental Solids in a Feedstock Heavy Marine Fuel Oil, the process comprising: contacting a Feedstock Heavy Marine Fuel Oil, wherein the Feedstock Heavy Marine Fuel Oil is compliant with ISO 8217 (2017) Table 2 as a residual marine fuel, except for: the concentration of the Environmental Contaminates is greater than 0.5 mass %, wherein the Environmental Contaminates are selected from the group consisting of sulfur, vanadium, nickel, iron, aluminum plus silicon and combinations thereof; and, the presence of Detrimental Solids, wherein the Detrimental Solids are suspended solid particulate materials in the Feedstock Heavy Marine Fuel Oil having a diameter in the range of 1000 microns to 0.1 microns, with a Detrimental Solids Removal Unit to give a pre-treated Feedstock Heavy Marine Fuel Oil that is substantially free of the Detrimental Solids; mixing a quantity of the pre-treated Feedstock Heavy Marine Fuel Oil with a quantity of an Activating Gas mixture to give a Feedstock Mixture; contacting the Feedstock Mixture with one or more catalyst materials under reactive conditions sufficient to both: i) decrease the concentration of Environmental Contaminants to less than 0.5 mass % and ii) minimize the level of hydrocracking in the Feedstock Mixture to less than about 10% volume swell resulting from hydrocracking, forming a Process Mixture from said Feedstock Mixture wherein said Process Mixture is composed of a Product Heavy Marine Fuel Oil liquid component, gaseous components and by-product hydrocarbon components; receiving said Process Mixture and separating a Product Heavy Marine Fuel Oil liquid component of the Process Mixture from the gaseous components and by-product hydrocarbon components of the Process Mixture and, discharging the Product Heavy Marine Fuel Oil liquid component as a Product Heavy Marine Fuel Oil wherein the Product Heavy Marine Fuel Oil complies with ISO 8217 (2017) Table 2 as a residual marine fuel and has a maximum Environmental Contaminants content between the range of 0.01 mass % to 0.5 mass %.

2. The process of claim 1 wherein said Feedstock Heavy Marine Fuel Oil has a sulfur content (ISO 14596 or ISO 8754) between the range of 5.0 mass % to 1.0 mass %.

3. The process of claim 1, wherein said Product Heavy Marine Fuel Oil has a maximum sulfur content (ISO 14596 or ISO 8754) between the range of 0.01 mass % to 0.5 mass %.

4. The process of claim 1, wherein said Feedstock Heavy Marine Fuel Oil has: a kinematic viscosity at 50° C. (ISO 3104) between the range from 180 mm$^2$/s to 700 mm$^2$/s; a density at 15° C. (ISO 3675) between the range of 991.0 kg/m$^3$ to 1010.0 kg/m$^3$; a CCAI is in the range of 780 to 870; a flash point (ISO 2719) no lower than 60° C.; a total sediment—aged (ISO 10307-2) less than 0.10 mass %; and a carbon residue—micro method (ISO 10370) less than 20.00 mass %.

5. The process of claim 1, wherein the detrimental solids removal unit is a reactor vessel having one or more beds of a dense packed inert catalyst material.

6. The process of claim 1, wherein the catalyst materials are selected to minimize hydrocracking under the reactive conditions and are selected from the group consisting of: a hydrodemetallization catalyst comprising one or more sulfided transition metals selected from the group consisting of group 6, 8, 9 and 10 of the Periodic Table supported on an inorganic oxide carrier; a hydrotransition catalyst comprising one or more sulfided transition metals selected from the group consisting of group 6, 8, 9 and 10 of the Periodic Table supported on an inorganic oxide carrier; a hydrodesulfurization catalyst comprising one, or more sulfided transition metals selected from the group consisting of group 6, 8, 9 and 10 of the Periodic Table supported on an inorganic oxide carrier; and wherein the Activating Gas is selected from mixtures of nitrogen, hydrogen, carbon dioxide, gaseous water, and methane, such that Activating Gas has an ideal gas partial pressure of hydrogen ($p_{H2}$) greater than 80% of the total pressure of the Activating Gas mixture (P).

7. The process of claim 6, wherein the reactive conditions, to minimize the level of hydrocracking in the Feedstock Mixture include: a ratio of the quantity of the Activating Gas to the quantity of Feedstock Heavy Marine Fuel Oil in the range of 250 scf gas/bbl of Feedstock Heavy Marine Fuel Oil to 10,000 scf gas/bbl of Feedstock Heavy Marine Fuel Oil; and, a total pressure between of 250 psig and 3000 psig; and, an indicated temperature between of 500 F to 900 F, and, a liquid hourly space velocity between 0.05 hr$^{-1}$ and 1.0 hr$^{-1}$.

8. The process of claim 1, wherein said Product Heavy Marine Fuel Oil has: a kinematic viscosity at 50° C. (ISO 3104) between the range from 180 mm$^2$/s to 700 mm$^2$/s; a density at 15° C. (ISO 3675) between the range of 991.0 kg/m$^3$ to 1010.0 kg/m$^3$; a CCAI is in the range of 780 to 870; a flash point (ISO 2719) no lower than 60° C.; a total sediment—aged (ISO 10307-2) less than 0.10 mass %; and a carbon residue—micro method (ISO 10370) less than 20.00 mass and an aluminum plus silicon (ISO 10478) content less than 60 mg/kg.

9. The process of claim 1 wherein the Detrimental Solids Removal Unit removes the Detrimental Solids from the Feedstock, Heavy Marine Fuel Oil by physical entrainment of the Detrimental Solids and wherein the Detrimental Solids Removal Unit is comprised of one or ore solids removal element selected from the group consisting of: a porous sintered metal filter having a permeametric radii from 50 to 100 microns; a porous sintered metal filter having a permeametric radii from 50 to 0.1 microns, a packed bed of deactivated particulate alumina, a packed bed of deactivated silica, and combinations thereof.

10. A process for reducing Environmental Contaminates and Detrimental Solids in a Feedstock Heavy Marine Fuel Oil, the process comprising: mixing a quantity of Feedstock Heavy Marine Fuel Oil, wherein the Feedstock Heavy Marine Fuel Oil is compliant with ISO 8217 (2017) Table 2 as a residual marine fuel, except for: the concentration of the Environmental Contaminates is greater than 0.5 mass %, wherein the Environmental Contaminates are selected from the group consisting of sulfur, vanadium, nickel, iron, aluminum plus silicon, and combinations thereof; and, the presence of Detrimental Solids, wherein the Detrimental Solids are suspended solid particulate materials in the Feedstock Heavy Marine Fuel Oil having a diameter in the range of 1000 microns to 0.1 microns, with a quantity of Activating Gas mixture to give a Feedstock Mixture; substantially removing the Detrimental Solids from the Feedstock Mixture and; subsequently contacting the Feedstock Mixture with one or more catalyst materials under reactive conditions sufficient to both: i) decrease the concentration of Environmental Contaminants in the Feedstock Mixture to less than 0.5 mass % and ii) minimize the volume of hydrocracking to less than about 10% volume swell from hydrocracking, to form a Process Mixture from said Feedstock Mixture, wherein said Process Mixture is composed of a Product Heavy Marine Fuel Oil liquid component, a by-product hydrocarbon component, a bulk gaseous component, a residual Detrimental Solids component, and a residual gas component; directly and subsequently receiving said Process Mixture in one or more first separation vessels that are not under reactive conditions and separating the bulk gaseous components of the Process Mixture from the remaining components of the Process Mixture; directly and subsequently receiving the remaining components of the Process Mixture in one or more second separation vessels that are not under reactive conditions and separating the residual gaseous component and the by-product hydrocarbon component from the Product Heavy Marine Fuel Oil liquid component and the residual Detrimental Solids component of the Process Mixture; and subsequently passing the Product Heavy Marine Fuel Oil liquid component and the residual Detrimental Solids component of the Process Mixture into a Detrimental Solids Removal Unit to remove the residual Detrimental Solids from the Product Heavy Marine Fuel Oil liquid component of the Process Mixture, and, subsequently discharging the Product Heavy Marine Fuel Oil liquid component of the Process Mixture as a Product Heavy Marine Fuel Oil, and the Product Heavy Marine Fuel Oil complies with ISO 8217 (2017) Table 2 as a residual marine fuel and has a maximum Environmental Contaminants content between the range of 0.01 mass % to 0.5 mass %.

11. The process of claim 10 wherein said Feedstock Heavy Marine Fuel Oil has a sulfur content (ISO 14596 or ISO 8754) between the range of 5.0 mass % to 1.0 mass %.

12. The process of claim 10, wherein said Feedstock Heavy Marine Fuel Oil has a kinematic viscosity at 50° C. (ISO 3104) between the range from 180 mm$^2$/s to 700 mm$^2$/s; a density at 15° C. (ISO 3675) between the range of 991.0 kg/m$^3$ to 1010.0 kg/m$^3$; a CCAI is in the range of 780 to 870; a flash point (ISO 2719) no lower than 60° C.; a total sediment—aged (ISO 10307-2) less than 0.10 mass %; and a carbon residue—micro method (ISO 10370) less than 20.00 mass %.

13. The process of claim 10, wherein the one or more catalyst materials are selected to minimize hydrocracking under the reactive conditions and are selected from the group consisting of: a hydrodemetallization catalyst comprising one or more sulfided transition metals selected from the group consisting of group 6, 8, 9 and 10 of the Periodic Table supported on an inorganic oxide carrier; a hydrotransition catalyst comprising one or more sulfided transition metals selected from the group consisting of group 6, 8, 9 and 10 of the Periodic Table supported on an inorganic oxide carrier; a hydrodesulfurization catalyst comprising one or more sulfided transition metals elected from the group consisting of group 6, 8, 9 and 10 of the Periodic Table supported on an inorganic oxide carrier; and wherein the Activating Gas is selected from mixtures of nitrogen, hydrogen, carbon dioxide, gaseous water, and methane, such that Activating Gas has an ideal gas partial pressure of hydrogen ($p_{H2}$) greater than 80% of the total pressure of the Activating Gas mixture (P).

14. The process of claim 13, wherein the reactive conditions selected to minimize the level of hydrocracking in the Feedstock Mixture include: a ratio of the quantity of the Activating Gas to the quantity of Feedstock Heavy Marine Fuel Oil in the range of 250 scf gas/bbl of Feedstock Heavy Marine Fuel Oil to 10,000 scf gas/bbl of Feedstock Heavy Marine Fuel Oil; and, a total pressure between of 250 psig and 3000 psig; and, an indicated temperature between of 500 F to 900 F, and, a liquid hourly space velocity between 0.05 hr$^{-1}$ and 1.0 hr$^{-1}$.

15. The process of claim 10, wherein said Product Heavy Marine Fuel Oil has: a of kinematic viscosity at 50° C. (ISO 3104) between the range from 180 mm$^2$/s to 700 mm$^2$/s; a density at 15° C. (ISO 3675) between the range of 991.0 kg/m$^3$ to 1010.0 kg/m$^3$; a CCAI is in the range of 780 to 870; a flash point (ISO 2719) no lower than 60° C.; a total sediment—aged (ISO 10307-2) less than 0.10 mass %; and a carbon residue—micro method (ISO 10370) less than 20.00 mass %, and a aluminum plus silicon (ISO 10478) content less than 60 mg/kg.

16. The process of claim 10 wherein the Detrimental Solids Removal Unit removes the Detrimental Solids from the Product Heavy Marine Fuel Oil by physical entrainment of the Detrimental Solids and wherein the Detrimental Solids Removal Unit is comprised of one ore solids removal element selected from the group consisting of: a porous sintered metal filter having a permeametric radii from 50 to 100 microns; a porous sintered metal filter having a permeametric radii from 50 to 0.1 microns, a packed bed of deactivated particulate alumina, a packed bed of deactivated silica, and combinations thereof.

17. A process for reducing the Environmental Contaminants and the Detrimental Solids in a Feedstock Heavy Marine Fuel Oil, the process consisting of:
   a. contacting a Feedstock Heavy Marine Fuel Oil with a Detrimental Solids Removal Unit to give a pre-treated Feedstock Heavy Marine Fuel Oil, wherein the Feedstock Heavy Marine Fuel Oil is compliant with ISO 8217 (2017) Table 2 as a residual marine fuel, except: the concentration of the Environmental Contaminates is greater than 0.5 mass %, and wherein the Environmental Contaminates are selected from the group consisting of sulfur, vanadium, nickel, iron, aluminum plus silicon, and combinations thereof; and, the Detrimental Solids are present, wherein the Detrimental Solids are suspended solid particulate materials in the Feedstock Heavy Marine Fuel Oil having a diameter in the range of 1000 microns to 0.1 microns;
   b. subsequently mixing a quantity of the pre-treated Feedstock Heavy Marine Fuel Oil with a quantity of an Activating Gas mixture to give a Feedstock Mixture;
   c. hydrodemetallization treatment of the Feedstock Mixture with one or more hydrodemetallization catalyst, materials and sending the effluent from Step c) directly to step d);
   d. hydrodesulfurization treatment of the effluent from step c with one or more hydrodesulfurization catalyst materials;
      wherein the combination of steps c and d form a Process Mixture from said Feedstock Mixture in the absence of hydrocracking catalyst and wherein said Process Mixture is composed of a Product Heavy Marine Fuel Oil liquid component, gaseous components and by-product hydrocarbon components and, wherein the combination of steps c and d take place in one or more reaction vessels under reactive conditions sufficient to both: i) decrease the concentration of Environmental Contaminants to less than 0.5 mass % in the Product Heavy Marine Fuel Oil liquid component, and ii) minimize the level of hydrocracking in the Product Heavy Marine Fuel Oil liquid component to less than about 10% volume swell attributable to hydrocracking;
   e. directly receiving said Process Mixture from step d in at least one separation vessel and separating the Product Heavy Marine Fuel Oil liquid component of the Process Mixture from the gaseous components and by-product hydrocarbon components of the Process Mixture and,
   f. discharging the Product Heavy Marine Fuel Oil liquid component from the at least one separation vessel as a Product Heavy Marine Fuel Oil to one or more storage vessels for the Product Heavy Marine Fuel Oil, wherein the Product Heavy Marine Fuel Oil complies with ISO 8217 (2017) Table 2 as a residual marine fuel and has a Environmental Contaminants content between the range of 0.01 mass % to 0.5 mass %.

18. A process for reducing the sulfur and Detrimental Solids content in a Feedstock Heavy Marine Fuel Oil, the process steps consisting of:
   a. mixing a quantity of the Feedstock Heavy Marine Fuel Oil with a quantity of an Activating Gas mixture to give a Feedstock Mixture, wherein the Feedstock Heavy Marine Fuel Oil is compliant with ISO 8217 (2017) Table 2 as a residual marine fuel, except for: the concentration of sulfur is greater than 0.5 mass %; and, the Detrimental Solids are present, wherein the Detrimental Solids are suspended solid particulate materials in the Feedstock Heavy Marine Fuel Oil having a diameter in the range of 1000 microns to 0.1 microns;
   b. separating the Detrimental Solids from the Feedstock Mixture to form a Feedstock Mixture substantially free from Detrimental Solids and subsequently sending the Feedstock Mixture substantially free from Detrimental Solids from b directly to c;
   c. hydrodemetallization treatment of the Feedstock Mixture substantially free from Detrimental Solids with one or more hydrodemetallization catalyst materials and sending the resulting effluent from c) directly to d);
   d. hydrodesulfurization treatment of the resulting effluent from c with one or more hydrodesulfurization catalyst materials and forming a Process Mixture in the absence of a hydrocracking catalyst, wherein said Process Mixture is composed of a Product Heavy Marine Fuel Oil liquid component, gaseous components, and by-product hydrocarbon components, and
      wherein steps c and d take place in one or more reaction vessels under reactive conditions sufficient to both: i) decrease the concentration of sulfur to less than 0.5 mass % in the Product Heavy Marine Fuel Oil liquid component, and ii) minimize the level of hydrocracking of the Feedstock Mixture produces a less than about 10% volume swell attributable to hydrocracking in the Product Heavy Marine Fuel Oil liquid component;
   e. directly receiving said Process Mixture in at least one separation vessel not under reactive conditions and separating the Product Heavy Marine Fuel Oil liquid component of the Process Mixture from the gaseous components and by-product hydrocarbon components of the Process Mixture and,
   f. discharging the Product Heavy Marine Fuel Oil liquid component from the at least one separation vessel as a Product Heavy Marine Fuel Oil to one or more storage vessels for the Product Heavy Marine Fuel Oil, wherein the Product Heavy Marine Fuel Oil complies with ISO 8217 (2017) Table 2 as a residual marine fuel and has a sulfur content between the range of 0.01 mass % to 0.5 mass %.

* * * * *